United States Patent [19]

Derdall et al.

[11] Patent Number: 4,828,811

[45] Date of Patent: May 9, 1989

[54] METHOD FOR PRODUCING PHOSPHORIC ACID FROM PHOSPHATE ORE

[75] Inventors: Gary D. Derdall, Saskatoon, Canada; William R. Erickson, Lakeland, Fla.; Robin L. Phinney, Saskatoon, Canada; James D. Wilson, Lakeland, Fla.

[73] Assignee: Potash Corporation of Saskatchewan, Saskatoon, Canada

[21] Appl. No.: 78,608

[22] Filed: Jul. 28, 1987

[51] Int. Cl.$^4$ ............................................. C01B 25/16
[52] U.S. Cl. .................................. 423/319; 423/167; 423/320
[58] Field of Search .................. 423/319, 321 R, 167, 423/320

[56] References Cited

U.S. PATENT DOCUMENTS

| | | | |
|---|---|---|---|
| 3,126,249 | 3/1964 | Atkin | 423/319 |
| 3,150,957 | 9/1964 | Seymour et al. | 423/319 |
| 3,919,395 | 11/1975 | Hauge | 423/319 |
| 4,393,030 | 7/1983 | Sardisco et al. | 423/319 |
| 4,393,032 | 7/1983 | Drechsel et al. | 423/319 |

*Primary Examiner*—Gregory A. Heller
*Attorney, Agent, or Firm*—Beveridge, DeGrandi & Weilacher

[57] ABSTRACT

A process and apparatus for producing phosphoric acid by the recovery of $P_2O_5$ from a phosphate ore is disclosed. A slurry of a phosphate ore in an aqueous phosphoric acid solution is formed in each of a plurality of reaction zones connected in series. Phosphate ore is introduced into the first reaction zone and phosphoric acid into the last reaction zone whereby the reaction of the phosphoric acid with the ore forms a slurry of coarse solids, fine solids and monocalcium phosphate in the phosphoric acid solution. A first process stream comprising coarse solids is removed from the first reaction zone and each of the other reaction zones and is transferred to the adjacent, successive reaction zone. A second process stream comprising fine solids is removed from the last reaction zone and the other reaction zones and is transferred into the adjacent, preceding zone in a direction which is countercurrent to the direction of flow of the first process stream and is concurrent with the direction of flow of the phosphoric acid from the last to the first reaction zones. A differential of phosphoric acid concentration is maintained between the reaction zones with the concentration decreasing in each reaction zone in the direction of flow of the first process stream.

31 Claims, 3 Drawing Sheets

METHOD FOR PRODUCING PHOSPHORIC ACID FROM PHOSPHATE ORE

BACKGROUND OF THE INVENTION

This invention relates to a method for the production of phosphoric acid by acidulation of phosphate ore and to an apparatus for carrying out the method.

The use of artificial fertilizers derived from phosphoric acid has increased greatly during recent decades. While there continues to be strong worldwide need for fertilizers and phosphate chemicals, many of the high grade and easily mined phosphate rock deposits are being depleted, leaving lower grade ores having a lesser amount of recoverable bone phosphate of lime (BPL). This has necessitated the increased usage of processes, termed beneficiation, to remove gangue and associated impurities to increase the BPL content of the phosphate rock used as raw material for acidulation. However, even with these processes, the overall grade of the resulting upgraded phosphate rock is generally decreasing. Some deposits are too poor to be economically upgraded. These factors, among others, are contributing to increased costs for producing phosphoric acid in many parts of the world and the increasing difficulties of some producers to continue to be competitive.

Beneficiation of the phosphate ore involves a number of unit operations. For example, for sedimentary ore, the material is scalped and the fine cut sent to sizing equipment, such as vibrating screens, to produce a coarse product (pebble) and a finer sand-concentrate rock mixture. Each of the size fractions is washed and dewatered. The water circulates through large ponds to deposit entrained slimes. The coarse product goes to storage piles for shipment. The sand-concentrate mixture is subjected to successive steps of selective flotation to separate the two. The rejected sand is slurried with water and pumped to the mine for fill. The concentrate phosphate rock is placed on storage piles for shipment. The coarse material scalped from the ore is often near grade material which must be discarded due to the inability or excessive cost for upgrading to an acceptable grade.

It will immediately be apparent that beneficiation of phosphate ore is a costly procedure, which adds significantly to the cost of producing phosphoric acid. Additionally, beneficiation technology currently cannot sufficiently upgrade certain ores for use in existing phosphoric acid plants. There exists a need in the art for a process and an apparatus for economically extracting $P_2O_5$ values from phosphate ore without the need for beneficiating the ore prior to acidulation. Where practical, the process and apparatus should be easily adapted to existing commercial phosphoric acid plants in order to minimize the capital investment required to commence large-scale operation.

SUMMARY OF THE INVENTION

Accordingly, this invention aids in fulfilling these needs in the art by providing process for producing phosphoric acid by acidulation of a phosphate ore and an apparatus for carrying out the process.

The process of this invention comprises forming a slurry of a phosphate ore in an aqueous phosphoric acid solution in each reaction zone of a multi-zone reaction system. The reaction zones are arranged in such a manner as to provide for the separation of the ore solids into two separate fractions. One fraction consists essentially of a slurry of coarse solids and calcium phosphate in the phosphoric acid solution, with a minor portion of fine solids. The other fraction consists essentially of a slurry of fine solids and calcium phosphate in the phosphoric acid solution, with a minor portion of coarse solids. Thus, the coarse solids and fine solids are processed essentially separately such that each can be treated under conditions which are optimum for their individual characteristics.

From the zone of entry for the feed ore, a first and second process stream are each removed and transferred separately such that the coarse solids and fine solids are essentially separated. The reaction zones which treat essentially the coarse solids are referred to as the coarse reaction zones and those that treat essentially the fine solids are referred to as the fines reaction zones. Essentially, the coarse solids are reacted in a countercurrent manner with the phosphoric acid and the fines solids are reacted in a cocurrent manner with the phosphoric acid, as further described below. The arrangement of zone combinations can be varied according to the nature of the ore feed to allow for processing variations from all coarse solids to all fine solids.

A first process stream is removed from the first coarse reaction zone and from each of the other coarse reaction zones in the system. This stream is typically an underflow stream from each coarse reaction zone. The first process stream, which comprises coarse solids from the coarse reaction zone, is transferred to the immediately adjacent, succeeding coarse reaction zone. Thus, for example, an underflow strea containing coarse solids from the first coarse reaction zone is transferred to the second coarse reaction zone, and an underflow stream from the second coarse reaction zone is transferred to the third coarse reaction zone, and so on.

A second process stream comprising fine solids and the phosphoric acid solution containing the monocalcium phosphate is removed from the last coarse reaction zone and from each of the other coarse reaction zones in the system. The second process stream is typically an overflow stream from the coarse reaction zone. The second process stream from each coarse reaction zone is transferred to the immediately adjacent, preceding coarse reaction zone in the system. Thus, the second process streams flow through the system in a direction that is countercurrent to the direction of flow of the first process streams.

A differential of phosphoric acid concentration is maintained across the circuit with the concentration decreasing in the direction of flow of the liquid phase.

Many of the fine solids in the second process stream from the first coarse reaction zone contain $P_2O_5$. These fine solids are reacted with the phosphoric acid in the stream until substantially all of the $P_2O_5$ is leached from the fine solids. This can be conveniently carried out in a fines reactor, which is described hereinafter. The resulting suspension is removed from the fines reaction zone and transferred to a settling zone, substantially free of coarse solids.

The suspension is combined with a flocculating agent in the settling zone to form a slurry comprised primarily of dissolved monocalcium phosphate in a phosphoric acid solution and a solid phase comprised of floc containing the fine solids. The solid phase is then partially separated from the liquid phase of the suspension to yield an essentially clean liquor containing the monocalcium phosphate-phosphoric acid solution and a more concentrated slurry of solids and solution. This can be accomplished by such means as gravity settling in a settler.

The clarified solution is transferred to a vessel wherein the monocalcium phosphate is reacted with sulfuric acid to form calcium sulfate crystals and additional phosphoric acid. Preferably, the crystals are the gypsum form of calcium sulfate [$CaSO_4 \cdot 2H_2$], however, they can alternately be of the hemi-hydrate [$CaSO_4 \cdot \frac{1}{2} H_2O$] form. The calcium sulfate crystals are removed from the phosphoric acid solution and a portion of the acid solution is recycled to the last coarse solids reaction zone of the process. The remainder of the phosphoric acid solution is removed as product from the process.

In one preferred embodiment of the invention, the floc slurry that is separated from the liquid phase of the suspension is processed by continuous countercurrent washing to transfer at least a portion of $P_2O_5$ therein to a wash water stream. The wash water stream, enriched in $P_2O_5$, can be combined with the suspension in the sludge settler or in the vessel to which the flocculating agent is added, or, to any of the reaction zones, in order to recover the $P_2O_5$ as product acid when the sulfuric acid is subsequently added. For optimum recovery of the soluble $P_2O_5$, the countercurrent wash system can include pressure type filters, such as belt press filters. These can be in any suitable combination with the wash stages, such as between stages or following the last stage. The solution containing $P_2O_5$, which is recovered from the filters, is fed back into the wash system at a point compatible with the strength of $P_2O_5$. The pressure type filters can be used alone, in place of the wash means, as an alternate embodiment of the invention.

In one embodiment of the invention the floc is processed through countercurrent washing with water using centrifuges between stages to effect solids/liquid separation. In another embodiment, decantation vessels can be used in place of the centrifuges.

The apparatus of the invention can be described as follows. At least two coarse solids reactor means for acidulation of the phosphate rock are connected in series. The coarse reactor means comprise a first reactor means and a second or last reactor means. The reactor means are typically agitated leach vessels. Means are provided for introducing phosphate ore or rock into the first reactor means, and means are provided for introducing into the last coarse reactor means an acid for attacking the ore.

The apparatus also includes means for transfering a first process stream comprising coarse solids and a minor portion of a liquid phase from each reactor means to the immediately adjacent, succeeding reactor means in the series countercurrent to the flow of the phosphoric acid. Similarly, means are provided for transfering a second process stream comprising a liquid pase and fine solids from each coarse reactor means to the immediately adjacent preceding coarse reactor means, except the last coarse reactor means in the series. These transfer means can typically be fluid handling conduits, pumps and liquid/solids separation devices, as needed.

A fines reactor is included in the apparatus. Transfer means are employed for transfering a second process stream from the first coarse reactor means to the fines reactor. The second process stream from the first reactor means contains fine solids and a liquid phase having monocalcium phosphate dissolved therein.

The apparatus further includes means, such as a mixing vessel, for combining a flocculating agent with liquid and fine solids from the fines reactor to produce a slurry of flocculated solids and a liquor having the monocalcium phosphate dissolved therein. Separating means, such as a gravity settler, are included for separating the flocculated solids from the liquor to yield a concentrated mass of flocculated solids and a substantially clear liquor.

Means are also provided for reacting the monocalcium phosphate in the liquor with sulfuric acid to produce calcium sulfate crystals in a phosphoric acid solution. This can be conveniently carried out in a crystallizer. Finally, additional separating means are provided for separating the calcium sulfate crystals from the phosphoric acid solution.

In one embodiment of this invention, the apparatus includes a continuous countercurrent wash system for processing the concentrated mass of flocculated solids to recover $P_2O_5$ values. The $P_2O_5$ thereby recovered can be recycled to the apparatus to ensure conversion to phosphoric acid product. In another embodiment, countercurrent decantation is used as the wash apparatus. In still another embodiment of the invention, the mass of flocculated solids is processed as in the countercurrent decantation system, except centrifuges and repulp tanks are used in place of the decantation vessels. Pressure filters, such as belt press filters, and repulp tanks may serve as still another embodiment of the invention.

The process and apparatus of the invention have been designed to provide improved product, significantly improved economics over previous processes and separate waste streams of higher quality to offer alternatives for disposal.

The design of the digestion circuit and the separate disposal of the waste materials provide economies, which allow the use of lower grade phosphate feeds. This eliminates the costs of beneficiation for many ores and, in fact, allows the use of low grade deposits that cannot be economically or sufficiently beneficiated to feed more traditional phosphoric acid plants. This may extend the economic life of certain ore deposits. Where unbeneficiated ores are used, there is a major reduction in the water required for disposal of the slimes, as compared to beneficiation processes. There is also a reduction or elimination of the conventional above ground slimes settling pond for slimes disposal.

By using countercurrent contact of the coarse phosphate material with the phosphoric acid solution, the size distribution of the phosphate material can be more coarse while still economically extracting the phosphate values. This reduces grinding requirements prior to feeding the ore into the process. Also, the inclusion of interstage sizing devices can retain the more coarse particles until they are dissolved to a sufficient level to ensure complete dissolution prior to exiting the system. This also allows a significant reduction in grinding costs over existing operations. Additionally, this scheme allows contact of the residual sand and unreacted coarse phosphae bearing material with the strongest acid solution just prior to exiting the system so that the greatest extraction of $P_2O_5$ from the solid phase can be assured. The scheme further insures optimization of $P_2O_5$ recovery by scouring the fine solids from the unreacted coarse solids prior to ejection from the system.

In the process and apparatus of the invention, the sand is removed separately from the fine sludge solids containing the slimes, thus enabling the fine solids to be washed and discharged in an efficient manner and enabling good recoveries of $P_2O_5$ from the fine solids. Separate discharge of the sand and fine wastes also provides more selective use of the wastes. The separate materials may be found useful, which makes them marketable to help reduce overall product acid cost. The fine material may prove useful as a source of other recoverable chemicals. If they are disposed of, they can be more selectively discarded as in land reclamation, wherein the coarse and fine material can be placed separately or together with little or no pretreatment.

BRIEF DESCRIPTION OF THE DRAWINGS

This invention will be more readily understood by reference to the drawing in which.

DETAILED DESCRIPTION

This invention involves digesting phosphate ore in an acid medium in a multiplicity of reaction zones to form monocalcium phosphate in a phosphoric acid solution, separating the solution from solids in the process, and converting the monocalcium phosphate to calcium sulfate crystals and additional phosphoric acid by reaction with sulfuric acid.

As used herein, the term "phosphate ore" has a broad meaning. The term is intended to include all naturally occurring mineral deposits containing phosphate as a component. The term phosphate ore includes phosphate ore that has been mined without being beneficiated after mining. The term also includes phosphate ore that has been beneficiated or upgraded to concentrate the $P_2O_5$. In addition, the term is to be understood as including within its meaning phosphate rock matrix.

The expressions "coarse solids" and "coarse fraction" are used interchangeably herein and are intended to mean solids that are intended to be transferred countercurrent to the liquid flow during digestion of the phosphate ore. The coarse solids can contain acid soluble as well as acid insoluble constituents. Examples of coarse solids are the larger fraction of the phosphate ore employed in the digestion step of the process and the sand obtained as a by-product of the process. For a typical Florida run-of-mine matrix, the coarse solids will have a particle size of about +65 mesh, but the size limit is not critical and ores from other deposits may have a different size limit. For example, an ore from an igneous deposit that has been ground to increase surface of the ore particles can have a lower size limit for the coarse fraction. Conversely, an ore from a sedimentary deposit that is easily attacked and broken down by acidulation can have a higher size limit for the coarse fraction.

The expressions "fine solids" and "fine fraction" are used interchangeably herein to mean solids that are intended to be transferred cocurrent to the liquid phase flow in the digestion of the phosphate ore. The fine solids can contain acid soluble or insoluble constituents. For a typical Florida run-of-mine matrix, the fine solids will have a particle size of about −65 mesh, but the size limit can vary depending upon the characteristics of the ore. The size limit is not critical and is governed by the same considerations as discussed in relation to the size limit for the coarse solids.

Either the coarse fraction or the fine fraction or both can contain recoverable $P_2O_5$ values. Thus, either or both of these fractions can be reactive with $H_3PO_4$. The invention will now be described in more detail.

Figure 1:
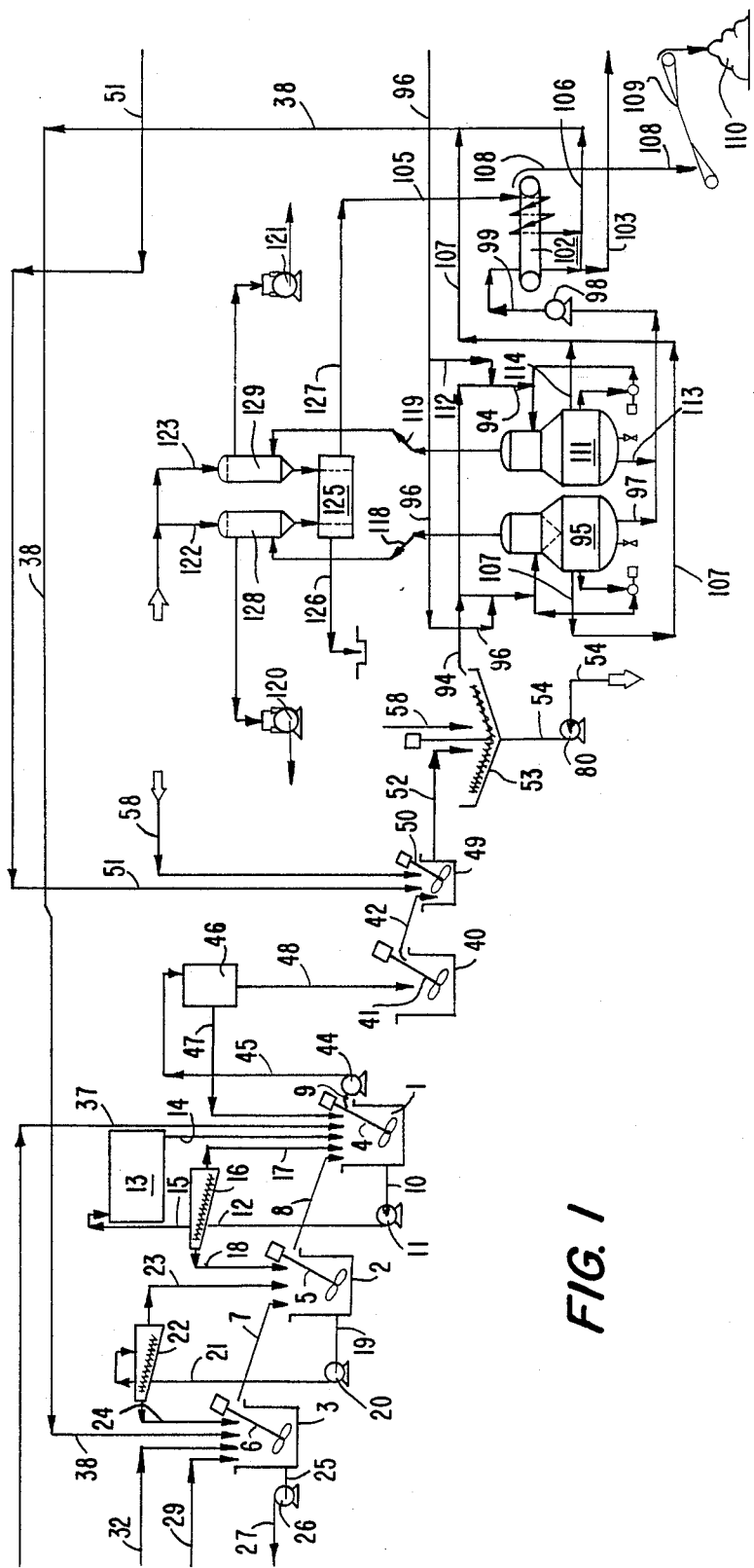
FIG. 1 is a flowsheet of a preferred embodiment of the process and apparatus utilized in treating phosphate ore according to the invention.

Referring to FIG. 1, the apparatus of the invention comprises a multiplicity of reaction zones, such as the zones defined by reactors 1, 2 and 3. Phosphate ore is introduced into reactor 1 through conduit 37, and a phosphoric acid solution is fed to reactor 3 through a conduit 38.

Each reactor has an underflow stream and an overflow stream. The overflow streams pass from reactor 3 to reactor 2 to reactor 1 in a direction that is opposite to the passage of underflow streams from reactor 1 to reactor 2 to reactor 3.

Each reactor is provided with means for agitating the contents of the reactor. For example, reactor 1 in FIG. 1 has a mixer 4 for mixing reactor contents. Similar mixers 5 and 6 are provided in reactor 2 and reactor 3, respectively.

As shown in FIG. 1, overflow from reactor 3 passes through a conduit 7 into reactor 2 where it is mixed with the contents of reactor 2 by means of mixer 5. Overflow from reactor 2 passes, in turn, through a conduit 8 to reactor 1 where it is mixed with the reactor contents by means of mixer 4.

The product from the digestion step is removed from reactor 1 through a conduit 9. The resulting slurry in conduit 9 comprises a phosphoric acid solution containing soluble monocalcium phosphate (MCP) plus unreacted fine solids, dissolved impurities and organics from the phosphate source. It can also, at times, include gypsum formed in the leach circuit due to free sulfuric acid in recycle phosphoric acid solution.

The underflow from each reactor comprises a slurry containing coarse and fine phosphate rock and sand in a liquid phase. The liquid phase has a composition that is substantially the same as the overflow of the reactor from which the underflow is removed. It will be understood that a portion of the liquid phase in one reaction zone can be transferred with the countercurrent stream of coarse solids to the adjacent reaction zone, but care should be exercised to maintain the concentration gradient so that the phosphate rock can be economically decomposed without excess capital investment in reaction vessels and auxiliary equipment. In order to maintain the concentration gradient between reaction zones in an installation of this type, coarse solids in the slurry are preferably separated from the liquid and fine solids before the coarse solids enter the adjacent vessel. The liquid fraction and fine solids remaining after the separation can be returned to the vessel from which they originated. This is achieved as follows.

Underflow from reactor 1 passes through a conduit 10 into a pump 11, which transfers the fluid stream through a conduit 12 to means for separating the main portion of liquid from solids in the stream. For example, as shown in FIG. 1, a screening device 13 separates excessively coarse phosphate rock from the stream. The excessively coarse rock in the stream is returned to reactor 1 through conduit 14 for further processing. Liquids, coarse solids to be transferred and fine solids from screening device 13 flow through conduit 15 into a separating device, such as a spiral classifier 16. The major portion of liquid and the main portion of fine solids and some coarse solids from classifier 16 are returned to reactor 1 through conduit 17. The major portion of coarse solids to be transferred and a minor amount of liquid and fine solids from classifier 16 are transferred through a conduit 18 to reactor 2 where the solids and liquid are mixed with the contents of the reactor by means of mixer 5.

Underflow of solids to reactor 2 is transferred to reactor 3 in a similar manner. More particularly, a conduit 19 is provided near the bottom of reactor 2. An underflow stream is removed from reactor 2 through conduit 19 and pumped by means of pump 20 through conduit 21 to classifier 22. The major portion of liquid in the stream is separated from coarse solids in classifier 22. The major liquid portion and main portion of fine solids are returned to reactor 2 through conduit 23 and the major portion of coarse solids and a minor portion of liquid are transferred through conduit 24 to reactor 3 where they are mixed with the contents of the reactor by means of mixer 6. A screening device similar to the screening device 13 can be installed in conduit 21 before classifier 22 if the underflow stream removed from reactor 2 contains phosphate rock that is too large in size to be digested in reactor 3 prior to exiting the system.

Figure 3:
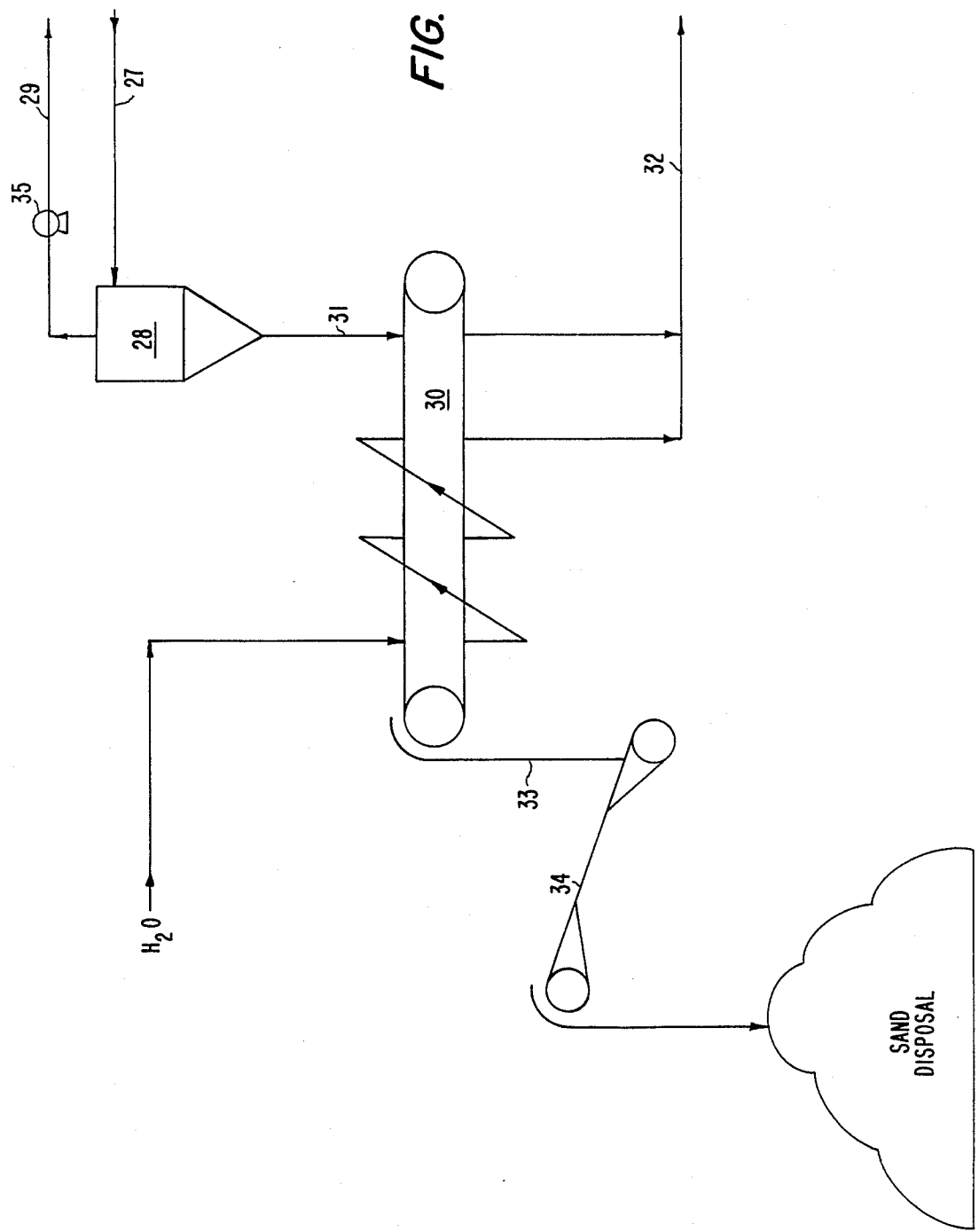
FIG. 3 is a schematic of the process and apparatus utilized to treat the unreacted coarse material removed from the last coarse solids reaction zone of the process and apparatus of the invention shown in FIG. 1.

Underflow from reactor 3 is comprised of a slurry that contains a solid phase comprised of a major proportion of coarse solids such as sand and a minor or no proportion of unreacted residues from the phosphate rock. This underflow stream is removed from reactor 3 through conduit 25 and transferred by means of a pump 26 through a conduit 27 to a separation device, such as cyclone 28, as shown in FIG. 3. The overflow of the cyclone, containing the major portion of liquid phase and fine solids, with a minor portion of the coarse solids, is transferred by pump 35 back to reactor 3 through conduit 29. The underflow of the cyclone, containing the major portion of coarse solids and a minor portion of liquid phase and fine solids is transferred to a sand filter 30, through conduit 31. Entrained acid is removed from the sand by countercurrent washing with water on the filter. The recovered acid solution and wash water are recycled to reactor 3 through conduit 32. The washed sand is transferred by means of conduit 33 and belt conveyor 34 out of the process area for suitable disposal.

It is thus apparent from FIG. 1 and the accompanying description that phosphate ore is transferred from one reaction zone to another in a direction that is countercurrent to the flow of solution and fine solids from one reactor to the next. It is also apparent that, by introducing phosphate ore into reactor 1 and phosphoric acid into reactor 3, the raw material having the highest $P_2O_5$ value is contacted with the weakest acid, whereas the raw material having the lowest $P_2O_5$ value is contacted with the strongest acid. This makes it possible to maximize the driving force for extraction in the later stages of the leaching operation where the $P_2O_5$ content of the solids is the lowest.

It will also be apparent from FIG. 1 and the accompanying description that the flow of fine solids and slimes evolved from the phosphate ore flows in a direction that is cocurrent to the flow of solution from one reaction zone to another. As the coarse material dissolves, it eventually becomes fine material. While the fine material reacts more quickly, real time is required. Thus, fines generated in subsequent reaction zones after the first zone must travel again through the zones through which they previously traveled. Thus, the least number of reactors required to dissolve the fine solids can be provided to yield higher $P_2O_5$ recoveries with less capital investment.

Referring once again to FIG. 1, overflow from reactor 1 is removed from the reactor through conduit 9. The overflow is a suspension containing fine solids, which include slimes, calcium sulfate crystals, other solid constituents containing $P_2O_5$ and undissolved organics. In addition, the suspension contains monocalcium phosphate in a phosphoric acid solution and dissolved impurities from the phosphate ore. While the fine solids can be separated from the suspension and discarded, it will be apparent that some $P_2O_5$ values will be lost.

In order to ensure that recovery of $P_2O_5$ from the phosphate ore is as complete as possible, this invention provides a fines reactor 40 into which the overflow stream in conduit 9 may be directly passed. Fines reactor 40 is provided with a mixer 41 for maintaining a substantially homogeneous suspension of solids in the liquid phase in the reactor. The residence time of the suspension in reactor 40 is sufficient to leach substantially all of the $P_2O_5$ from the fine solids, after which the suspension is removed from the reactor through conduit 42 for further processing. Substantially all of the $P_2O_5$ can be leached from the fine solids in the fines reactor even though the residence time in the reactor is of relatively short duration.

The overflow stream in conduit 9, which may contain a minor amount of coarse solids that originate in reactor 1, is preferably transferred by pump 44 through a conduit 45 to a screening device 46 in which coarse solids are separated from the liquid and fine solids. Coarse solids are returned to reactor 1 through conduit 47, and the liquid and fine solids pass into the fines reactor 40 through conduit 48.

Alternatively, when the overflow from reactor 1 is removed through conduit 9 and is introduced directly into fines reactor 40, a slurry containing any coarse solids which may be present in the fines reactor 40 can be removed from the bottom of such reactor and introduced into a separating device, such as one similar to device 46, for further screening and separation. The coarse solids may be returned to reactor 1 and the fine solids and liquid may be returned to fines reactor 40 for further leaching or introduced into vessel 49.

The suspension from the fines reactor passes through a conduit 42 to another vessel 49 provided with a mixer 50. At this stage the suspension comprises fine solids in a liquid phase constituted essentially of dissolved impurities and monocalcium phosphate in a phosphoric acid solution. A flocculating agent is added to vessel 49 through a conduit 51 and mixed with the vessel contents by means of mixer 50. This results in the formation of a slurry comprised of floc particles in suspension in a liquid phase containing the solution of $H_3PO_4$ and monocalcium phosphate. The floc contains the fine solids, including slimes, and undissolved organic contaminants bound in the floc particles.

The slurry containing the flocculated solids is passed from vessel 49 through a conduit 52 to a primary settler 53 where the flocculated solids are separated from the slurry. The floc settles rapidly in the settler to form a dense layer at the bottom and a liquid phase above the layer. The liquid phase has a clear portion comprised of a liquor mainly containing monocalcium phosphate in the phosphoric solution.

The layer at the bottom of sludge or gravity settler 53 comprises a mixture of the liquid phase and the flocculated fine solids, including slimes, insoluble organic matter and some of the liquor occluded in the floc. Since the liquor phase and occluded liquor contain monocalcium phosphate and phosphoric acid, the bottom layer is removed as an underflow stream from the settler and further processed to recover some of the $P_2O_5$. This is accomplished in one scheme as follows.

Figure 2:
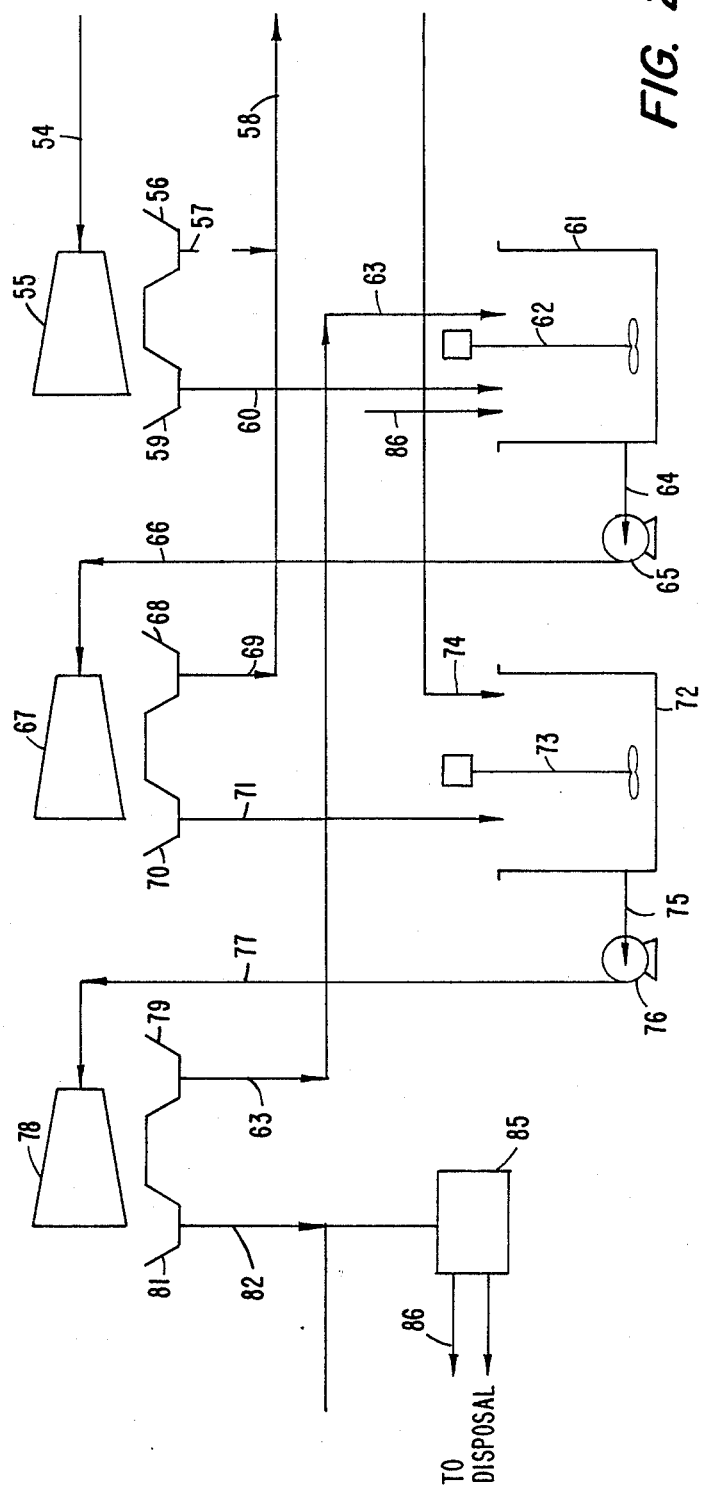
FIG. 2 is a schematic of an embodiment of a countercurrent sludge wash system and apparatus which may be used with the process and apparatus shown in FIG. 1.

The underflow stream from settler 53 is fed to a continuous countercurrent sludge wash circuit via a conduit 54 and pump 80. In the circuit the underflow from the settler is passed countercurrent to a stream of wash water so that the wash water is enriched in phosphoric acid and monocalcium phosphate following contact with the floc. The floc is simultaneously depleted of soluble components. This is shown in FIG. 2 as follows.

The underflow stream in conduit 54 is fed to a centrifuge 55 that essentially separates the solids from the liquids, including the entrained liquor in the floc particles. The major portion of the liquid flows into vessel 56 and through conduits 57 and 58 and is returned to the sludge settler 53 or to any of the reaction zones. The solids portion containing some liquid enters vessel 59 and is carried by conduit 60 into vessel 61, which is provided with a mixer 62 which mixes the solids and entrained liquid with wash solution transferred from centrifuge 78 through conduit 63 to thereby transfer a portion of the soluble phosphate in the entrained solution to the wash solution. The mixer 62 aids mass transfer of solubles from the liquor to the wash water. The slurry in vessel 61 is then transferred through conduit 64 by means of pump 65 into centrifuge 67. Centrifuge 55 and vessel 61 form the first stage of the countercurrent sludge wash circuit.

The procedure that is carried out in the first unit of the countercurrent sludge wash circuit is repeated by transferring the slurry in vessel 61 through conduit 64, pump 65 and conduit 66 into centrifuge 67. The second sludge wash circuit is comprised of vessel 68 which collects a major portion of the liquid separated from the slurry by centrifuge 67 and conveys it through conduit 69 into conduit 58 and returns it to sludge settler 53 or any of the reaction zones. The solids portion of the slurry with a portion of the liquid passes from centrifuge 67 into vessel 70, through conduit 71 into vessel 72 provided with a mixer 73. Fresh water is furnished to vessel 72 by means of conduit 74.

This procedure can incorporate as many stages as necessary to recover the soluble $P_2O_5$ associated with the solids. As shown in FIG. 2, the final stage of mixing is followed by a final centrifuge 78. The floc in vessel 72 is transferred via conduit 75, pump 76, and conduit 77 into centrifuge 78. The major portion of the liquid from the centrifuge passes through vessel 79 and conduit 63 and is returned as wash water through conduit 63 into vessel 61 of the first countercurrent sludge wash circuit. This minimizes the need for fresh water in the circuit. The thickened mass leaving centrifuge 78 is collected by vessel 81 and flows through conduits 82 and 83 to a sludge disposal area (not shown).

If required for improved performance of the centrifuges in separating the solids from the liquid phase, an appropriate flocculating agent can be added to the solids-liquid slurry by injection into the conduit prior to entry into the centrifuge, such as into conduit 66 before entry into centrifuge 67. This forms a new floc with the solids to improve separation in the centrifuge.

As an alternate to optimize $P_2O_5$ recovery, the thickened mass at the bottom of vessel 81 is removed through conduit 82 and transferred to a belt press filter 85, where liquids are removed to produce a primary filtrate and a filter cake. The primary filtrate is transferred through conduit 86 to vessel 61 of the first stage of the sludge wash circuit where it combines with the wash water from centrifuge 78. If desired, the primary filtrate can be added to vessel 72 of the second stage. The filter cake can be disposed of as appropriate, or, processed further to produce other products.

The solids from the filter 85 are removed from the process and can be discarded or used as a by-product.

The first stage of the wash circuit produces a stream that is enriched in $P_2O_5$ and is removed from centrifuge 55 of the first stage and transferred through conduits 57 and 58 to the sludge settler 53. Alternately, the stream can be added to any of the reactors 1, 2 and 3 or, depending upon the operating conditions and the ore being processed, the stream could be transferred to any of a number of places in the process. As an illustrative example, the stream from the wash circuit could be added to the incoming ore being fed to the first reaction zone to allow pretreatment of the ore before entry into the first reaction zone. The recovering of phosphoric acid from the process will now be described.

In addition to providing a thickened mass of flocculated solids for processing in the countercurrent sludge wash circuit, the primary settler 53 also provides a clear overflow stream containing monocalcium phosphate in a phosphoric acid solution. By contacting the solution with sulfuric acid, the monocalcium phosphate can be converted to calcium sulfate and additional phosphoric acid. This reaction is carried out in a crystallizer where calcium sulfate crystals precipitate, following which the crystals can be removed from the phosphoric acid solution.

Referring once again to FIG. 1, clear liquor in settler 53 is transferred through a conduit 94 to a crystallizer 95. Sulfuric acid is added to the crystallizer through a conduit 96 and combined with the liquor to form calcium sulfate crystals in the crystallizer.

In one preferred embodiment of the invention, the crystallizer is of the classifying type. The thickened slurry of coarse calcium sulfate crystals formed at the bottom of the crystallizer 95 is removed through a conduit 97 and transferred by pump 98 and conduit 99 to a filter 102 where the liquid from the settler is removed as a primary filtrate through conduit 103 and the solids remaining on the filter are washed. Fresh water or water recycled from a cooling pond can be supplied through conduit 105 for washing the calcium sulfate crystals. The crystals are washed in multiple stages, and the resulting wash liquid forms a secondary filtrate, which can be returned to the leach circuit as part of the recycle phosphoric acid stream through conduits 106 and 38.

The classifying crystallizer 95 also produces a clear overflow stream containing phosphoric acid. This stream can be removed through a conduit 107 and combined with the secondary filtrate stream passing through conduit 106 from filter 102 to form the recycle phosphoric acid stream passing through conduit 38 as shown in FIG. 1.

Calcium sulfate crystals are discharged from filter 102 at 108 onto a belt conveyor 109 for removal to a pile of solids 110.

Due to the unusually clean environment in which the crystals are grown, they have typically shown unique characteristics, compared to calcium sulfate crystals from existing processes to make wet process acid. They normally exhibit a higher filtration rate and are much cleaner, which makes it more feasible to convert the material into other forms of usable products.

Depending upon the quantity of liquor discharged from the primary settler 53, it may be desirable to use more than one crystallizer for converting the monocalcium phosphate to phosphoric acid and calcium sulfate. Thus, as shown in FIG. 1, another crystallizer 111 is arranged in parallel with crystallizer 95 to receive the liquor in conduit 94. Sulfuric acid is added to crystallizer 111 through a conduit 112, and the resulting slurry containing calcium sulfate crystals is removed through conduit 113 and transferred to filter 102 by pump 98 and conduit 99. The clear overflow stream containing phosphoric acid is removed through conduit 114 and passes through conduit 107 and is combined with the secondary filtrate stream in conduit 106 to form the recycle phosphoric acid stream flowing through conduit 38.

The crystallization process has been described above in connection with a classifying crystallizer. If a non-classifying crystallizer is employed, it is preferable to utilize an agitator in the crystallizer to maintain a uniform slurry and to transfer the resulting slurry to a suitable preliminary solid-liquid separating device, such as a cyclone, in order to provide a more concentrated solids stream to the filter 102. The low solids overflow stream from the preliminary solids-liquid separation device joins with the secondary filtrate in conduit 106 from filter 102 to form the recycle phosphoric acid stream flowing through conduit 38. Again, more than one suitable solid-liquid separating device may be used in parallel.

The crystalline form of the calcium sulfate in the crystallizer can be controlled by regulating the crystallization temperature. For example, calcium sulfate hemihydrate is formed at a higher crystallization temperature than calcium sulfate dihydrate. In the proess of this invention, the gypsum form is preferred because it finds more widespread use and can be more easily disposed of. One advantage of the process is the ability to operate the crystallizer at conditions favorable for calcium sulfate precipitation while operating the reactor sections at conditions favorable for the recovery of $P_2O_5$ from the ore. Thus, the crystallizer is provided with a system to allow control of the temperature by evaporative cooling of the slurry of phosphoric acid solution and calcium sulfate crystals. In a preferred embodiment of the invention, a classifying type crystallizer operating under a vacuum provides for both the crystallization of the calcium sulfate crystals and for the evaporative cooling in one common vessel.

Several alternate methods for providing evaporative cooling are available. However, a preferred embodiment for use with the classifying crystallizer is shown in FIG. 1. A portion of the water vapors in the crystallizers 95, 111 may be pumped through conduits 118, 119 to barometric condensers 128, 129. Cooling water enters the condensers through conduits 122, 123 and the cooling water and the condensate that is formed in the condensers flow into seal tank 125. A portion of the liquid in seal tank 125 is removed through conduit 126 and transferred to an area water site. Another portion of the liquid in seal tank 125 is transferred through conduit 127 into conduit 105 and then to filter 102. Non-condensible gases are extracted from the barometric condensers by vacuum pumps 120, 121. An alternative to the use of vacuum pumps is the use of steam ejectors.

In the case of an agitated, non-classifying crystallizer, either the entire vessel can be placed under a vacuum to provide the evaporation cooling, or, the solids-liquid slurry can be circulated through a separate flash cooler vessel and back into the crystallizer. The vacuum is then applied to the flash cooler in a manner described above.

It will be apparent from the foregoing description that the process of this invention produces a phosphoric acid stream derived from phosphate ore. A portion of the phosphoric acid can be recycled to the leach circuit for acidulation of the ore. The slimes produced during the acidulation operation are collected and concentrated in solid form in the dense floc discharged as sludge from the sludge wash circuit. This greatly facilitates disposal of the slimes and eliminates the need for the slime ponds used in other processes. The coarse, unreacted material is rejected separately to provide more efficient washing and more effective use or disposal of the material. Each stage of the process of this invention will now be described in greater detail. The following outline is provided for convenience.

1. Digestion of Phosphate Ore.
  1. (A). Reaction Zones
  1. (B). Phosphate Ore Raw Material
  1. (C). Water
  1. (D). Phosphoric Acid Reagent
  1. (E). Mixing
  1. (F). Reactor Slurry
  1. (G). Reaction Time
  1. (H). Reaction Temperature
  1. (I). Classifying and Screening
  1. (J). Defoaming Agent
  1. (K). Alternate Acids.
2. Fines Reactor.
3. Flocculation Stage.
4. Separation of Flocculated Solids.
5. Crystallization of Calcium Sulfate.
6. Temperature Control.
7. Continuous Countercurrent Wash of Fine Solids.
8. Separation of Solids and Liquids.
  8(A). Recovery of Coarse Unreacted Solids from the Leach Circuit.
  8(B). Filtration of Calcium Sulfate Crystals.
  8(C). Filtration of Sludge from Countercurrent Wash Circuit.
9. Phosphoric Acid Product.
10 Examples.

1. Digestion of Phosphate Ore

The phosphate ore is digested in a multiplicity of reaction zones in an agitated slurry containing an acid for attacking the ore. The following factors affect the digestion step of the process.

1.(A). Reaction Zones

The digestion step of the process of this invention is carried out in at least two reaction zones. The number of reaction zones employed can vary over a wide range to provide the best economics, provided certain conditions are met. Sufficient zones must be provided to allow essentially full recovery of $P_2O_5$ by reaction of the calcium phosphates with phosphoric acid to form soluble monocalcium phosphate and also allow discharge of the residual coarse solids and unreacted fine solids, plus, any gypsum, or hemihydrate formed in the reaction zones, as separate streass. Preferably, the formation of gypsum or hemihydrate is minimized. The optimum number of reaction zones must economically balance providing the required residence time as larger tanks in fewer zones versus smaller tanks in more zones. This is achieved by evaluation of the reactivity and particle size distribution of the phosphate raw material as related to the optimum ratio of unreacted calcium to phosphoric acid $P_2O_5$ in each stage.

The optimum number of reaction zones will also depend on reaction kinetics and leaching rates from the solid phase to the liquid phase forming the reaction slurry. If there is good agitation and intermixing with efficient contacting between reactants, the solid phase reactant will approach its equilibrium concentration as fixed by solubility in the liquid phase.

The composition of the mixture overflowing the reaction zone is substantially the same as that within the reaction zone. The reaction zones should be arranged in order to maintain a concentration gradient of monocalcium phosphate between the inflow of liquid phase to one reaction zone and the outflow of liquid phase from the same reaction zone. Maintaining a concentration gradient between reaction zones provides the reaction driving force when the overflow from one zone passes to the next zone.

The reaction zones can be provided by employing a multiplicity of separate reaction vessels or by dividing a single reaction vessel into compartments or zones. In either event, back-mixing of liquid and fine solids from one reaction zone to another and short-circuiting between reaction zones should be avoided in order to maintain the concentration gradient.

When separate reaction vessels are provided, it is preferred that stirred-tank reactors be employed. In the preferred embodiment of the invention, at least two continuous stirred-tank reactors are employed in series in order to obtain high conversions.

Within the reaction vessels, the solids are agitated in such a manner to ensure that kinetics are not limited by lack of agitation, but in such a manner as to avoid excessive carryover of coarse material in the cocurrent direction. The vessels can be designed to minimize such carryover in the overflow streams.

Reactor size will depend upon the characteristics of the mass transfer between the solid and liquid phases, reactant feed rates and degree of agitation. The reactors should be large enough to provide sufficient retention time in the total system for the phosphate ore to be substantially completely leached. Reactor size can vary from one reaction zone to another and optimum reactor size can be determined by mathematical modeling or with a minimum of experimentation.

From the point of entry of the phosphate ore, the coarse solids are successively conveyed through agitated zones countercurrent to the flow of the solution stream, while the fine solids are carried cocurrently through one or more agitated zones. For both the coarse and fine solids, the phosphate ore is reacted with the phosphoric acid to leach the phosphate values.

While the phosphate ore can be added to reactor 1 as shown in FIG. 1, it will be understood that, depending on the size distribution and reactivity, the ore can be added to one of the other reactors or to any combination of reactors. The point of entry of the rock can affect the number of reaction zones required to substantially completely decompose the ore, and it can also affect the distribution and relative proportions of the coarse and fine fractions in each reaction zone.

For large scale operation of the process for an extended time period, the reactants can be continuously added to the leach circuit and products can be continuously removed. Conventional gravimetric and volumetric equipment can be employed for this purpose. In the preferred embodiment of this invention, the reaction zones are defined by independent vessels having constant overflow and to which phosphate rock and phosphoric acid are continuously added and overflow from the final reaction zones is continuously removed. It will also be understood, however, that the process can be operated by adding the reactants comprising phosphate rock, phosphoric acid and water to the reaction vessels on an intermittent basis. Similarly, products can be intermittently withdrawn from the reaction zones.

1.(B). Phosphate Ore

Many grades of phosphate ore can be used in the process of this invention. This includes phosphate from sedimentary deposits as well as igneous and metamorphic rock. The phosphate deposits can encompass variations and differing compositions within the same source. They can have a variety of geological structures and complex mineral make-up.

A primary phosphate ore employed in the invention is comprised mainly of apatite, a primary variation of which is referred to as fluorapatite or phosphorite. The quality or grade of the phosphate ore employed in this invention can vary over a wide range. The phosphate ore can contain minor amounts of other constituents, such as iron, aluminum, uranium, chlorine, vanadium, silicon oxides, clays, calcite, magnesite, dolomite, sulfur oxides, sodium oxide and organic matter.

The phosphate ore employed as raw material can be wet or dry. Dry phosphate ore or phosphate ore having a very low moisture content can be employed where water in the rock would upset the material balance for the process. In the particularly preferred embodiment of the invention, matrix is employed as the raw material without drying the matrix prior to use.

The phosphate ore can be obtained from a number of different deposits. While satisfactory results have been obtained using ores derived from deposits in Central and North Florida, ores from other deposits, such as other sections of Florida, Arkansas, Tennessee, Idaho, Montana, Utah and Wyoming can also be employed. Phosphate ores from other countries, such as Canada, Australia, Brazil, Egypt, Northern Africa, including Morocco, South Africa, India, Jordan and the USSR can also be employed.

For sedimentary phosphate ore having an average particle size greater than about ⅜ to ¼ inch, retention time in the leach circuit may be uneconomically long. In addition, it is difficult to mix a slurry containing solids of a wide range of sizes. Thus, while the invention will process more coarse solids, it is preferred that the matrix be broken up into particles of less than about ¼ inch, depending on the reactivity of the ore. For less reactive igneous or metamorphic ores it may be necessary to require size reduction to a higher specific surface area in order to expose the phosphate to the acid medium and achieve desired reaction rates and, thus retention times. Size reduction can be carried out using conventional equipment, such as a ball mill, rod mill, hammer mill or cage mill. The phosphate rock matrix can then be transferred to the process by conventional conveying equipment. For igneous or metamorphic ores, free sulfate levels may need to be higher than for porous sedimentary ore.

For phosphate ore meeting the economic criteria for processing in the invention, it is not necessary to beneficiate or upgrade the ore prior to use. Thus, the ore can be employed without subjecting it to the costly procedures heretofore needed to increase BPL content prior to introduction into the process. Alternately, a beneficiated rock, of either high or low grade, can be employed.

For retrofit into existing mines or for mines with exceptionally high levels of slimes, the process of the invention can take, as feed, the sand-concentrate and pebble streams out of a washer. Savings up to 60% of the current costs of beneficiating the ore into a finished product suitable for present chemical plants should be possible.

1.(C). Water

The process of the present invention requires the use of water to wash solid wastes for recovery of $P_2O_5$ and for formation of either calcium sulfate hemihydrate or dihydrate (gypsum). The water is employed in an amount sufficient to achieve these objectives. Large amounts of water should be avoided, since material handling and energy costs increase without a concomitant increase in process efficiency.

1.(D) Phosphoric Acid

Phosphate values and calcium are leached from phosphate ore by contacting the ore with an aqueous solution of phosphoric acid. Phosphoric acid having a concentration of about 10% by weight to about 40% by weight is fed to a reaction zone as previously described. Preferably, the phosphoric acid has a concentration of about 20% by weight to about 30% by weight.

The primary reaction is the digestion of phosphorus containing mineral by phosphoric acid to produce soluble phosphates, such as monocalcium phosphate from fluorapatite. Sufficient phosphoric acid solution must be provided to both react with all of the phosphate mineral present and to take the resulting soluble phosphate into solution. The phosphoric acid solution is employed in each reaction zone in an amount sufficient to achieve these goals. Thus, for fluorapatite, as the percentage of calcium in the phosphate ore increases, an equivalent increase in phosphoric acid solution should be provided. A deficiency in the amount of phosphoric acid solution supplied to the process can result in the formation of insoluble calcium phosphates, which can lead to significant losses of $P_2O_5$.

Additionally, certain impurities can react with the phosphoric acid. The major such impurity is usually calcium carbonate, which reacts to form water, carbon dioxide and monocalcium phosphate. Thus, sufficient phosphoric acid solution must be supplied to react with the fluorapatite and calcium carbonate and to take the resulting monocalcium phosphate into solution.

The quantity of recycle acid required has been stated for known similar processes in terms of the ratio of $P_2O_5$ in the recycle acid to the $P_2O_5$ in the phosphate bearing material being treated. When only $P_2O_5$ ratios are used, the efficiency can vary when calcium impurities vary in the feed material. The process of this invention is most efficiently operated when the reactive calcium compounds in the phosphate feed material are determined and the recycle acid rate established on the basis of the ratio of $P_2O_5$ in the recycle acid to the calcium in the feed material. By then controlling the leach circuit based on a ratio of $P_2O_5$ in the recycle acid to the calcium in the feed material, the efficiency of the operation can be maintained. The ratio based on the amount of residual unreacted material derived from the ore entering the final reaction tank compared to the fresh recycle acid entering this tank can be on an order of magnitude of 100 times as great as the overall ratio. When the weight ratio of total $P_2O_5$ in the recycle acid divided by total Ca in the rock is in excess of about 7:1, but more typically about 10:1 to about 15:1 for typical Florida ores, recovery of substantially all of the phosphate can reasonably be expected. The optimum ratio will be dependent upon the nature of the phosphate raw material.

The recycle phosphoric acid can either contain free sulphate or not, although large amounts of free sulphate should be avoided. However, in some instances, slimes settling may be assisted by the presence of some gypsum. The sulphate reacts with calcium to form water insoluble gypsum or hemihydrate according to the following reactions:

The formation of excessive calcium sulfate solids in the leach section creates difficulties in economically balancing the recovery of $P_2O_5$ from solids to be disposed of versus water returned to the system with the recovered $P_2O_5$. In addition, for typical Florida type ores, large amounts of free sulfate can result in coating of the phosphate rock by calcium sulfate, protecting such rock from further attack by the acid H+. The amount of free sulphate in the phosphoric acid should not exceed about 1 to about 2% by weight for Florida type ores, although a temporary excess that does not adversely affect long-term operating conditions can be tolerated. Some ores, usually of igneous origin, may tolerate or require higher free sulfate levels. These will require a balance between $P_2O_5$ recovery by reaction and $P_2O_5$ losses by entrainment due to larger quantities of sludge.

1.(E). Mixing

Efficient mixing of the reactants in each reaction zone is desired, since mixing affects the progress of the chemical reactions. Mechanical agitation can be employed to obtain a well-mixed vessel in which solids are maintained in liquid suspension. Uniformity of concentration and temperature within each reaction zone can be achieved by proper agitation design selected from several alternate types, or combination of types available.

Impeller mixers equipped with constant or variable speed drive motors have been found to be suitable for use in the reactors. High pumping capacity and low impeller velocity are preferred in order to minimize the adverse effects of abrasion on the mixer elements and the reaction vessel. It will be understood that other types of mixers, such as flow mixers and pump mixers, can be employed. Circulation of the slurry can also be attained by pumping.

It will be understood that once the reactants are mixed and the calcium leach and phosphate conversion are in an advanced stage, a lower agitation energy level can be employed. Thus, the degree of mixing can be varied from one reaction zone to another.

Baffles can be installed in the reaction zones to control liquid swirling, or draft tubes can be provided to control the direction and velocity of the slurry within the vessel.

1.(F). Reactor Slurry

The composition and solids content of the slurry in each reaction zone can vary over a wide range. These factors should be balanced to ensure the substantially complete breakdown of the phosphate rock in the shortest time and with the least expense.

The solids content (dry basis) of the slurry in each reaction zone will be determined by the required residence times for the solid and liquid phases and the ratio of recycle acid to matrix calcium input to the system, plus any calcium sulfate formed in each zone. Optimum slurry density can be determined with a minimum of experimentation.

The concentration of $P_2O_5$ in the liquid phase of the slurry increases from one reaction zone to the next as the overflow from one reaction zone passes to the next zone due to leaching of the $P_2O_5$ from the ore. The $P_2O_5$ concentration of the liquid phase will depend upon the $P_2O_5$ content of the phosphate ore, concentration of attack acid, porosity of the rock, temperature, degree of agitation and residence time. The composition of the liquid phase in the overflow from a reaction zone will generally be the same as the liquid phase in the underflow from that reaction zone when the slurry in the reaction zone is well agitated.

Phosphate rock typically contains fluorine, and once fluorides have entered the reaction system, some portion is converted to volatile compounds. A major environmental problem in the manufacture of phosphoric acid is the production of effluent gases containing fluorides. It has been found that, under some operating conditions, reduced amounts of volatile fluorine compounds are liberated by the process of this invention. Nevertheless, in the event gaseous elements or compounds are released during the reaction, they can be carried away by an air stream and recovered or discarded.

1.(G). Reaction Time

The reaction time will depend upon the nature of the phosphate ore and especially its physical properties and chemical constituents. The reaction time for the coarse fraction, and thus the retention time of the coarse fraction in the reaction zones, should be sufficient to substantially completely decompose the phosphate ore in the slurry and to convert the ore to soluble monocalcium phosphate and residual coarse solids. The retention time can be the same in each reaction zone or retention time can vary from one reaction zone to the other in order to optimize the economic recovery of $P_2O_5$. For example, the slurry can be held in one vessel for a short time sufficient to quickly remove the fine fraction, but coarse solids can be retained for a longer time period or recycled to the same reaction zone.

A major factor controlling reaction time is the specific surface area of the phosphate ore. If the ore is coarse and not porous, the reaction rate will be low and longer retention times will be required. Conversely, if the rock is very porous, shorter retention times can be employed for the same size rock. In either event, coating of the particles of phosphate rock by gypsum should be avoided, since coating can reduce the reaction rate very significantly.

For a reactive sedimentary type ore, similar to Florida deposits, a reduction to $-\frac{1}{4}''$ and selective screening in the digestion circuit to hold the coarse particles until reacted to a certain size minimizes both the grinding costs and the digestion circuit volume. Without selective screening for large particles, either extensive grinding or extensive reaction zone volumes may be required.

The retention time for the fine fraction in the slurry can typically be less than the retention time for an equivalent coarse fraction, since the rate of reaction of the fine fraction is usually considerably greater. Nevertheless, it will be understood that fine and coarse fractions for ores similar to Florida ores can be retained in the reaction zones for substantially the same time without adversely affecting the process. This may vary for igneous or less reactive rocks.

1.(H). Reaction Temperature

The reaction between the phosphate rock and phosphoric acid is exothermic. Efficient operation of the system depends on control of the temperature. The operating temperature will depend on the reactivity of the feed material and can range from about 120° F. to about 200° F. However, optimum temperatures have been found to be about 150° F. to about 180° F. for typical Florida ore.

Reaction temperature can ordinarily be controlled by regulating the temperature of the reactants fed to the reaction zones. Nevertheless, if heat transfer requirements become excessive, heating and cooling means can be incorporated within or external to the reaction zones. For example, means can be provided for cooling one or more of the underflow or overflow streams being transferred from one reaction zone to another. Heat can also be removed by water evaporation into the air that is drawn across the slurry accompanied by efficient surface agitation. Vacuum cooling can also be employed.

The process of the invention can use relatively dilute phosphoric acid and still attain very high efficiencies at relatively low temperatures (e.g., approximately 150°–180° F.).

1.(I). Classifying and Screening

The coarse fraction of the phosphate ore is transferred from one reaction zone to another countercurrent to the flow of liquid between the reaction zones as previously described. The coarse material is transferred from vessel to vessel by a method which minimizes the transfer of liquid in the same direction, thus maintaining as nearly as is practical the countercurrent system. A typical method involves pumping the slurry to a separating device. If a separating device is not employed, it may be necessary to employ a larger number of reaction stages in order to obtain a sufficiently high ratio of acid $P_2O_5$ to unreacted calcium in each stage for efficient removal of the Ca and $P_2O_5$ from the phosphate ore.

Separation of coarse solids from liquids can be carried out using conventional classification techniques and equipment. For example, well-known mechanical, non-mechanical and hydraulic classifiers can be employed. Satisfactory results have been obtained with a dewatering screw. The slurry is retained in the dewatering screw for a sufficient time to allow the coarse solids to settle. Slimes and fine gypsum do not have time to settle and are retained in the liquid. The fine solids leave the dewatering screw with the liquid effluent, returning to the reaction zone from which they came. Mechanical and gravitational means can be used to continuously remove the coarse solids from the dewatering screw and to transfer them to another reaction zone.

As the phosphate ore is transferred from one reaction zone to another, the ore gradually diminishes in size as calcium and $P_2O_5$ values are leached from the rock so that a product consisting essentially of unreactive coarse solids can be removed from the last reaction zone. If the phosphate ore particles leaving the early stages of the leaching operation are too large, the particles may not be completely broken down prior to leaving the last reaction zone. In this event, the coarse solids leaving the zone will be contaminated with unreacted calcium phosphates, which constitutes a loss. While retention times in the reaction zones can be increased or the feed material can be ground to a finer size to obviate this problem, another alternative is to install a screening device upstream of the classifier in one or more of the early stages of the leach operation (see, e.g., screen 13 in FIG. 1). For a ground feed or one having essentially all fine material, the dewatering screw alone is adequate. For a coarse feed of essentially $-\frac{1}{4}''$ material, the use of a scalping device, such as a screen, ahead of the dewatering screw is preferred for the first one or two vessels in order to enhance $P_2O_5$ recovery. In this case, the very coarse solids are returned to the vessel from which they came.

1.(J). Defoaming Agent

Gases originate from the release of $CO_2$ occurring during the conversion of the phosphate ore. This can lead to the formation of foam due to organics associated with the phosphate raw material. The occurrence of a substantial amount of foam in the slurry containing the phosphate ore solids in the liquid medium is ordinarily not excessive. Nevertheless, mechanical foam breaking can be employed or a conventional defoaming agent can be added as needed. If a defoaming agent is required, the amount employed will be on the order of parts per million relative to the amount of phosphate ore used. The consumption of defoaming agent should be minimized, since the defoaming agent can add considerable cost to the process. In the preferred embodiment of this invention, the reaction slurry is substantially free of defoaming agent.

1.(K). Alternate Acids

While phosphoric acid is the reagent of choice, it will be apparent to persons skilled in the art that the process of the invention can be modified to operate with nitric or hydrochloric acid as the digestion agent. The use of phosphoric acid to leach Ca from the raw material avoids the introduction of counter ions, such as $NO_3-$ and $Cl-$ into the system.

2. Fines Reactor

The slimes derived from the acidulation of phosphate ore are discarded in many prior art processes. One of the economic limitations of these processes is the loss of $P_2O_5$ values in the discarded slimes. In the process of the present invention, the fine solids are leached as they pass through each of the reaction zones, from last to first, before being introduced into the fines reactor. The slimes fraction derived from acidulation of phosphate ore comprises part of the fine solids in the liquid medium from the leach circuit, which is treated in the fines reactor of this invention to remove $P_2O_5$ bound in the slimes. The sludge resulting from the fines reactor can be washed in a suitable countercurrent system and then discarded with very little loss of water soluble $P_2O_5$. Suitable systems could be based on countercurrent decantation, centrifuges, belt press filters or any appropriate combination of such devices.

The liquid medium containing suspended solids from the leach circuit is fed to the fines reactor downstream of the feed point for the phosphate ore. If the amount of fine solids is low, the fines reactor can be by-passed or eliminated without a substantial effect on process economics. This can occur, for example, with phosphate ores that produce a small amount of slimes. In most cases, however, a large quantity of fine solids is washed out of the leach circuit and the fine solids contain $P_2O_5$ in a sufficient amount to justify further processing in the fines reactor.

Since the quantity of fine solids depends, in part, on characteristics such as ore density and mineralogy, and since these characteristics can vary from one ore deposit to another or within the same deposit, the fines reactor can be employed to accommodate variations in these characteristics. Use of the fines reactor thus makes it unnecessary to impose stringent specifications for the chemical and physical properties of the phosphate ore used as the raw material in the leach circuit It is also possible to employ as the raw material mixtures of ores from different deposits.

It is not necessary to screen the slurry fed to the fines reactor unless it is desired to remove entrained coarse solids prior to introduction of the slurry into the reactor. In the preferred embodiment of the invention the slurry is substantially free of coarse solids. Reaction conditions, such as residence time or degree of mixing in the fines reactor, can be easily adjusted to ensure substantially complete leaching of the $P_2O_5$ in the solids.

In leaching $P_2O_5$ from the fine solids, additional monocalcium phosphate is taken up by the phosphoric acid solution in the reactor. This results in the slimes being present in the solid phase in the medium in the reactor and most of the calcium being present in the liquid phase. The existence of these materials in different phases facilitates separation of the materials from each other by conventional mechanical devices. Thus, the calcium derived from the process can be recovered with minimum contamination by slimes. This is an advantage where the calcium-containing liquid is subsequently processed to convert the monocalcium phosphate to useful chemicals, such as phosphoric acid and gypsum, by reacting the monocalcium phosphate with a reagent, such as sulfuric acid, since these products will likewise be free of slimes contamination.

The effluent from the fines reactor is substantially free of coarse solids, although any coarse solids entrained in the effluent can be readily removed by screening, if desired. Substantially all of the $P_2O_5$ in the phosphate ore raw material is contained in the liquid phase of the effluent as phosphoric acid or bound to the calcium as a phosphate, mainly monocalcium phosphate.

While the fines reactor has been described with reference to a single reaction vessel (i.e., fines reactor 40 in FIG. 1), more than one fines reactor can be employed in series or in parallel. For instance, two or more fines reactors can be employed if the volume of liquid from the leach circuit is too large to be economically handled in a single vessel or if the lad of fine solids in the liquid is so great that reaction kinetics or fluid movement in the fines reactor are impeded. As another example, a multiplicity of fines reactors can be employed in series when the $P_2O_5$ content of the fine solids from the leach circuit is so high that there is insufficient driving force for economical recovery of the $P_2O_5$ in a single reactor.

When a multiplicity of fines reactors are employed in series, other reaction vessels can be added downstream of fines reactor 40 shown in FIG. 1. The liquid dispersion of fine solids is then passed from vessel to vessel.

In another embodiment of the invention, reaction vessels can be added upstream of fines reactor 40 or the point of entry of the phosphate ore can be changed in order to convert one or more of the leach tanks into fines reactors. For example, phosphate ore matrix can be introduced into reactor 2 instead of reactor 1 shown in FIG. 1. Reactor 1 thus becomes a fines reactor that functions in series with fines reactor 40. One can achieve considerable flexibility in carrying out the process of the invention in order to optimize process economics with only minor modifications to the apparatus.

In the process described in relation to FIG. 1, the fine solids in the fines reactor originated in the immediately preceding reaction zone of the leach circuit. It will be understood, however, that the fine solids can be obtained from other stages of the process. For example, all or a portion of the fine solids in the fines reactor can be obtained from the overflow from one of the other reactors, such as reactors 2 or 3 in the leach circuit, or from the decanted liquid from one or more of the classifiers, such as classifiers 16 or 22.

Residence time in the fines reactor will vary, but the time should be sufficient to ensure substantially complete extraction of the $P_2O_5$ from the fine solids. This can be readily determined by routine monitoring of the $P_2O_5$ content of the solids in the reactor overflow stream (e.g., 42 in FIG. 1). The residence time in the fines reactor will usually, but not necessarily, be less than the combined residence times of the media in the reaction zones in the leach circuit because the larger surface area of the particles in the fines reactor results in a more rapid reaction rate.

Temperature control in the fines reactor has not been found to be critical. The reaction temperature will usually be about the same as the temperature in the reaction zones of the leach circuit.

The reaction medium in the fines reactor should be sufficiently mixed to obtain a substantially uniform dispersion of the fine solids in the liquid without erosion of the surfaces of the apparatus. This will ensure rapid and complete conversion of the $P_2O_5$. Use of a well-mixed stirred tank reactor has been found to produce acceptable results.

3. Flocculation Stage

The liquid phase of the leach slurry from the coarse solids reaction zones and fines reactors contains substantially all of the $P_2O_5$ in the phosphate ore from which the slurry was derived. The slurry also contains coarse and fine solids, although the quantity of coarse solids will generally be very small. In the preferred embodiment of the invention the leach slurry is substantially free of coarse solids.

The fine solids in the leach slurry are composed of unreacted fractions of the phosphate ore and any gypsum or hemi-hydrate that may have formed during the acidulation step.

A flocculating agent is employed when it is desired to thicken the solids in the leach slurry in order to accelerate separation and removal of these solids. This is achieved by reacting the flocculant with organic material that is not soluble in the $H_3PO_4$ solution and with solid contaminants, such as silicas and clays, present in the solution. The presence of some gypsum may assist in settling the floc. The resulting floc rapidly settles in the liquid phase under the influence of gravity.

When the flocculating agent is added to the leach slurry, contaminants and impurities are collected and wrapped up in the resulting floc particles. The floc particles are visible, have an amorphous shape and readily separate from the main portion of the liquid phase. The formation of large floc aggregates is desired because large floc aggregates generally settle more rapidly than small floc particles. Preferably the entire overflow stream from the acidulation of the phosphate ore is treated with the flocculating agent after any coarse solids are removed.

A flocculating agent having a high molecular weight and low cost should be employed. The flocculating agent should provide the highest obtainable floc density at the lowest cost. It has been found that the optimum flocculating agent varies with the properties of the phosphate ore from which the leach solution is derived. The flocculating agent must be compatible with the phosphoric acid solution and the monocalcium phosphate in solution; that is, the formation of floc should not be inhibited by these substances and the floc, once formed, should be resistant to breakdown while in contact with the solution. Among the flocculants that have been found to be suitable are Nalco 7871, Nalco 7872, Nalco 7873 and Nalco 7877, which are available from Nalco Chemical Company, Oak Brook, Ill. 60521.

The amount of the flocculant added to the leach solution is based on the cost to settle the solids at an acceptable rate. The flocculant should be employed in an amount sufficient to settle substantially all of the solids with the floc that is formed. Large dosages of flocculant that result in too high a viscosity in the liquid medium should be avoided.

The amount of flocculating agent employed will also depend on the phosphate ore that was acidulated. For example, an ore having a high organic load or one producing a large quantity of slimes will generally require a larger dosage of flocculant in the flocculation step.

The most suitable flocculating agent and the optimum amount of the flocculating agent can be determined by a simple test. For example, a dilute aqueous solution of the flocculating agent can be added to a graduated cylinder containing the leach slurry, the cylinder can be inverted several times, and the time required for the resulting solids interface to reach equilibrium can be measured. The more effective flocculants will require less time for the solids interface to stabilize.

The leach solution and flocculating agent should be sufficiently mixed to provide a substantially homogeneous dispersion. This can be achieved in an agitated mixing vessel to which the reactants are added or in a slurry pipe containing the leach slurry to which the flocculant is added. Mild agitation and turbulence are usually sufficient. Excessive shearing should be avoided, otherwise floc formation can be impeded or floc particles can be broken apart thereby yielding smaller particles that settle more slowly than floc aggregates.

The effluent from the flocculation step is a slurry comprised of floc in suspension in a liquid phase containing $H_3PO_4$, monocalcium phosphate and dissolved impurities in solution. The floc contains the fine solids, including the slimes, and organic contaminants bound in the floc particles.

The flocculated fine solids include slimes, insoluble organic matter and some of the liquor entrained in the solids. The solid phase can be discarded, although it is preferred to subject the solids to further processing to recover any remaining $P_2O_5$. In one preferred embodiment of the invention, countercurrent washing, with interstage centrifuges to separate the solids from the wash solution, is used. In another preferred embodiment, continuous countercurrent decantation is used to separate soluble $P_2O_5$ from inert or insoluble solids. Alternative methods can be used to accomplish the same result. For example, filtration will yield some of the soluble $P_2O_5$ in the solids. More complex methods can also be employed to yield additional products of commercial value. Centrifuges or continuous countercurrent decantation are favored because they provide reliable performance and low operating cost with acceptable recoveries of $P_2O_5$.

4. Separation of Flocculated Solids

The flocculated solids in the effluent from the flocculation step are separated from the slurry by any one of several separation processes. Economical separation can be achieved by taking advantage of the density difference between the liquid and solids in the slurry. It has been found that the floc settles very rapidly under the influence of gravity to form a dense layer at the bottom of a vessel.

The liquid phase remaining after the flocculated solids have settled is comprised mainly of monocalcium phosphate and dissolved impurities in the aqueous phosphoric acid solution. The liquid phase is substantially free of visible solids; that is, the resulting liquor appears clear to the unaided eye. If necessary, small amounts of solid contaminants can be removed from the solution with a polishing device, such as a polishing filter. Additionally, the removal of the insoluble organics produces either a reen or light amber solution, rather than the typical black product of most current processes. To achieve this in current processes requires calcining of the ore prior to feeding to the process, which adds significant cost.

The solid phase comprises the flocculated fine solids, including slimes, insoluble organic matter and some of the liquor entrained in the solids. The solid phase can be discarded, although it is preferred to subject the solids to further processing to recover any remaining $P_2O_5$.

The settling apparatus is designed to optimize the rate of settling of the flocculated solids. The use of a gravity thickener for the continuous settling of flocculated solids is preferred. A large diameter tank with slow moving radial rakes that gently agitate the settled floc, consolidate the solids and move the solids toward a central discharge can be employed to thicken a large volume of the slurry from the flocculation step. The clear liquor overflows from the thickener and the consolidated solids form an underflow stream from the thickener. Multiple thickeners can be employed in series or in parallel.

The residence time of the slurry in the thickener should be sufficient to provide the clear liquor overflowing from the thickener and the underflow of solids concentrated to the fullest extent practical. In contrast to the months to decades required to settle slimes in a typical above ground slimes pond, the floc settles in a matter of minutes. The amount of solids in the underflow will depend on economic factors, but solids concentration can be increased by lengthening residence time.

The temperature in the thickener can vary over a wide range. Since the viscosity of the slurry decreases with increasing temperature and since the floc settles more rapidly as viscosity decreases, higher temperatures in the thickener are preferred. When the temperature in the thickener is substantially the same as the temperature in the flocculation step, the floc can be efficiently separated by the action of gravity without the need for temperature control in the thickener. Heat loss from the thickener can be minimized by the use of insulation and by limiting evaporation of liquid in the thickener.

5. Crystallization of Calcium Sulfate

The clear liquor remaining after the removal of flocculated solids is fed to a crystallizer where it is reacted with sulfuric acid to convert the monocalcium phosphate to calcium sulfate crystals and additional phosphoric acid. One of the important objectives of this step is to form calcium sulfate crystals that can be easily separated from the phosphoric acid solution by settling and filtration, thus minimizing soluble $P_2O_5$ losses.

In the process of this invention, calcium sulfate crystallization in phosphoric acid can produce the hemihydrate ($CaSO_4.\frac{1}{2}H_2O$) or the dihydrate $CaSO_4.2H_2O$), depending upon the crystallization conditions. In any event, the calcium sulfate crystals should have surface and volume characteristics that facilitate filtration in subsequent processing steps.

The crystals should be capable of forming a filter cake with sufficient porosity to allow the phosphoric acid to flow through with ease. The crystals can be a mixture of different shapes. The process of this invention produces crystals generally having a cubic or semi-round structure as determined by examination under an optical microscope, and it has been found that the phosphoric acid solution can be efficiently separated from these crystals by filtration.

The identity, size and shape of the calcium sulfate crystals depend on a number of factors, including sulfuric acid concentration, agitation, impurities in the reaction medium, temperature and phosphoric acid concentration. The hydration state of the calcium sulfate crystals can be controlled by regulating crystallization temperature in the process of this invention. For a given phosphoric acid concentration, increasing the crystallization temperature will favor the formation of hemihydrate crystals. For example, at a phosphoric acid concentration of about 28% $P_2O_5$, the hemihydrate forms at temperatures above about 85° C., the dihydrate forms at temperatures below about 85° C., and the anhydrite is formed at temperatures above about 135° C. Formation of the dihydrate is preferred because of its greater commercial value as a by-product of the process. One advantage of the process is the ability to operate the crystallizer at conditions favorable for calcium sulfate precipitation while operating the reactor sections at conditions favorable for the recovery of $P_2O_5$ from the ore.

Retention time for the reaction medium and calcium sulfate crystals in the crystallizer should be sufficient for all of the monocalcium phosphate to react with the sulfuric acid and for crystals large enough to have good filtration characteristics. Retention time of about one hour has been found to be sufficient, although optimum retention times can be determined by monitoring the crystallizer effluent for unconverted monocalcium phosphate and crystal characteristics.

Reaction of the monocalcium phosphate with the sulfuric acid is carried out in a large volume of liquid in the crystallizer. The reaction proceeds very rapidly after the reagents are mixed. The crystallizer can be operated with about 5 to about 40% solids by weight.

The sulfuric acid is usually added to the crystallizer as a concentrated solution and should be efficiently dispersed in the reaction medium in order to avoid the formation of localized zones having high sulfuric acid concentrations and the formation of overheated zones caused by the heat of dilution of the concentrated sulfuric acid.

The crystallizer can be any one of several forms. Crystallization can be carried out in a single reaction chamber, a multi-chamber vessel or a multiplicity of vessels in parallel or in series. For example, the crystallizer can be of either the classifying type or a non-classifying, agitated vessel. If the crystallizer is of the classifying type, the resulting thickened slurry can be removed and sent to a filter. If the crystallizer is of the non-classifying type, the resulting slurry can be fed to a thickener system from which a more concentrated slurry is derived. The concentrated slurry can then be fed to a filter, and the resulting clarified overflow can be extracted for recycle to the process.

As previously noted, concentrated sulfuric acid must be dispersed to a low concentration in the slurry in the crystallizer. Thus, the use of vigorous agitation or pumping will aid in achieving uniform reaction conditions throughout the non-classifying crystallizer. Agitation should be sufficient to keep the calcium sulfate in suspension for crystal growth.

While it has not been found necessary to use an additive in the crystallization stage, conventional additives can be employed to control reaction or crystal formation. For example, one can employ a crystal habit modifier, crystallization retarder or enhancer, or a scavenging agent for impurities that may be liberated.

Generally, the amount of sulfuric acid employed in the crystallization stage is about sufficient to convert all of the monocalcium phosphate to calcium sulfate. At least a stoichiometric amount of the sulfuric acid is employed in the preferred embodiment of the invention. A small excess or a small deficiency of sulfuric acid can be tolerated, and in some cases, may even be advantageous.

Specifically, the monocalcium phosphate is converted to calcium sulfate and phosphoric acid in a phosphoric acid solution. When an excess of sulfuric acid is employed in the crystallization reaction, it will be apparent that free sulfate will be present in the phosphoric acid solution. If the phosphoric acid is recycled to the leach circuit to attack the phosphate ore, the free sulfate will react with calcium in the ore to form calcium sulfate solid, which can accompany fine solids from the leach circuit through the fines reactor and into the flocculation stage where the calcium sulfate also combines with the floc. If the flocculated fine solids derived from the phosphate ore do not settle rapidly in the settler, increasing the amount of calcium sulfate in the settler can increase the apparent density of the flocculated solids and the rate of settling of the floc. Thus, by increasing the quantity of free sulfate in the recycle acid, the amount of floc produced and the rate of settling of the floc can be increased.

Conversely, if the flocculated fine solids settle rapidly in the settler without the aid of calcium sulfate solids, then free sulfate in the recycle acid should be minimized, because the calcium sulfate solids formed in the leach circuit will have to be carried through the system and discarded with flocculated sludge from the settler or from the continuous countercurrent wash system.

Another reason why the sulfuric acid should not be employed in large excess when the acid is to be recycled to the leach circuit is that a large excess of free sulfate in the recycle acid can result in the formation of a calcium sulfate coating on the phosphate ore thereby impeding attack of the ore by the phosphoric acid. Generally, when the sulfuric acid is employed in excess, the sulfuric acid concentration in the crystallization stage should be such that the sulfuric acid in the product phosphoric acid does not exceed about 3% by weight of the phosphoric acid, and in the preferred embodiment of the invention, the sulfuric acid is about 0.5 to about 1.5% by weight for Florida type ores. The values may be higher for less reactive ores, such as igneous materials. One advantage of the process is that the free sulfate in the reaction zones can be controlled at a higher level, if needed, than the level used in the crystallizer by injection of sulfuric acid to the recycle acid. Thus, better operating conditions can be achieved for less reactive rock while retaining low losses of unused free sulfuric acid in the product stream leaving the process.

As previously noted, the sulfuric acid can be employed in the crystallizer stage in an amount less than the stoichiometric amount. In this event, the product phosphoric acid will have a negative free sulfate concentration; that is, there will be unreacted Ca in the acid. This will minimize the formation of calcium sulfate solids in the leach circuit. Thus, when the slurry from the fines reactor is mixed with the flocculating agent, the resulting flocculated solids will be substantially free of calcium sulfate. This may be an advantage if the flocculated solids are converted to a by-product that should be free of calcium sulfate.

6. Temperature Control

The reaction heat from phosphate ore decomposition, the heat of dilution of the sulfuric acid, and the heat of reaction of the sulfuric acid with the monocalcium phosphate can be efficiently removed from the process during the crystallization stage. Removal of heat from the crystallizer has a direct and immediate effect on crystallization conditions. In addition, if phosphoric acid from the process is recycled to the leach circuit, the removal of heat from the crystallizer can be used to control the temperature in the leach vessels and in the other stages of the process that precede the crystallizer.

The cooling necessary to maintain the temperature in the crystallizer can be provided by any of a number of different techniques. For example, a stream of air can be passed over or through the liquid in the crystallizer in order to evaporate water and thereby produce a cooling effect. Sufficiently high rates of heat exchange between the air and liquid are difficult to achieve in large scale operations. For this reason, it is preferred to use a flash cooling of the slurry. By one system, a portion of the hot reaction medium in the crystallizer is pumped into an evaporation chamber that is under vacuum. Heat release is achieved in the chamber by the boiling slurry and evacuated vapor. The cooled slurry flows back into the crystallizer where it is mixed with the reaction medium to cool the medium.

The vacuum level on the flash cooler has a direct effect on the amount of evaporation in the cooler. Therefore, since the heat in the slurry from the crystallizer is removed as evaporative heat in the cooler, the vacuum level directly affects the amount of cooling obtained. The vacuum level can be adjusted to provide sufficient evaporation to maintain the reaction medium in the crystallizer at a temperature that favors the formation of the crystals of calcium sulfate dihydrate.

The feed rate of the slurry from a non-classifying crystallizer to the flash cooler determines the amount of evaporation that can be carried out at a specified vacuum level. The feed rate and vacuum level should be established to provide a temperature drop of about 1° C. to about 2° C. A higher temperature drop can lead to the formation of calcium sulfate scale in the flash cooler and related piping. A multiplicity of flash coolers arranged in parallel can be utilized to ensure the required degree of cooling.

Where the system uses a classifying or circulating type crystallizer, the entire crystallizer vessel can be operated under the vacuum, rather than circulating the slurry through a separate flash cooler. The same basis for control of temperature will apply in these cases.

Vapor leaving the flash cooler or crystallizer can contain small droplets of phosphoric acid slurry. A separator can be employed to remove the entrained droplets and a recycle line can be provided to return the droplets to the crystallizer in order to minimize $P_2O_5$ losses in the process.

The vapor from the flash cooler is passed through a condenser where it is condensed to create the vacuum. Alternately, residual heat in the vapor can be recovered by thermal recompression and then utilized in the process. The condensate can be sent to a cooling pond for reuse. Alternately, the warm condensate can be used as wash water in subsequent steps in which the calcium sulfate crystals are processed for recovery. Returning the condensate to the process in this manner will minimize $P_2O_5$ losses.

7. Continuous Countercurrent Wash of Fine Solids

As previously described, the underflow stream from the primary settler contains flocculated fine solids and some of the liquor from the thickened slurry. The floc aggregates are loose and retain a significant amount of liquor in their structures when the floc settles in the thickener. The liquor contains monocalcium phosphate (MCP) in a phosphoric acid solution, and processing the underflow stream by any of several continuous countercurrent wash systems can result in the recovery of up to about 92% of the $P_2O_5$ accompanying the floc. This is achieved by passing the underflow stream from the primary settler countercurrent to a stream of wash water so that the wash water is enriched in phosphoric acid and MCP following contact with the solids, and the solids are simultaneously depleted of these soluble components.

More particularly, the underflow stream from the settler can be contacted with the wash water stream in a vessel provided with means for disrupting the floc particles. The occluded liquor is thereby released and a homogeneous slurry is formed. A tank provided with a high shear mixer has been found to be suitable for this purpose. The mixer not only disrupts the floc, but also provides the vigorous mixing required for efficient liquid/liquid contact between the wash water and the liquor containing the phosphoric acid and MCP.

In a preferred embodiment, the slurry is passed from the mixing vessel into a centrifuge. Between the mixing vessel and centrifuge, a flocculation agent is added to form a new floc. A stream comprising a thickened mass of solids, which has been at least partially depleted of $P_2O_5$, is thereby obtained from the centrifuge.

The thickened solids from the centrifuge can be fed to another unit comprising another mixing vessel and another centrifuge in order to remove part or all of the remaining $P_2O_5$. Thus, in a multi-stage contact circuit, the thickened solids from one centrifuge is fed to another agitated vessel where once again the floc is disrupted and contacted with wash water to enrich the wash water in phosphoric acid and MCP. The overflow from one unit containing MCP in the phosphoric acid solution can be fed to the adjacent unit in a direction countercurrent to the direction of flow of the solids. This procedure can be repeated as many times as is economically practical to recover the $P_2O_5$ in the floc. Thus, the liquid phase associated with the solids is continuously diluted relative to $P_2O_5$ content as the solids progress through the circuit so that the resulting thickened slurry exiting the final unit contains a liquid phase significantly more dilute relative to $P_2O_5$ value. The liquid overflow stream from the last unit on the other hand, is substantially enriched in phosphoric acid and MCP. This liquid stream can thus be returned to the settler, the flocculant addition tank, or one of the reaction vessels, or used as a wash liquid in the coarse solids wash and filtration operation to allow maximum recovery of $P_2O_5$ with the least amount of fresh water input to the overall process. This provides an opportunity to remove from the process any solids that may be entrained in the return solution from the wash circuit, since the entrained solids will be captured in the floc formed during the flocculation step and then removed from the liquid when the floc settles in the thickener. Alternately, the liquid stream can serve as a feed to another process.

It has been found that fresh flocculating agent should be added following at least one of the units in which the floc was disrupted. This can be achieved by mixing the flocculating agent with the wash water and the disrupted floc after the mixing vessel. The addition of fresh flocculating to the circuit can enhance solids separation in the centrifuges.

The fresh flocculating agent is employed in an amount sufficient to restore the broken floc particles to floc aggregates that rapidly separate from the liquid phase. The amount can be varied to ensure economical settling for various fine solids characteristics. Generally, the amount of flocculating agent required for efficient separation will be less for solids having a low slimes content than for solids with a high slimes content. The amount is also less at higher temperatures in the units. The flocculating agent can be continuously added to the system or it can be added in increments. Furthermore, the flocculating agent can be of he same type as the flocculating agent described in connection with the flocculation step, and in the preferred embodiment of this invention, the same flocculating agent is used in the flocculation step and in the wash circuit.

The wash water entering the countercurrent wash circuit can be fresh water or water that originates from another stage in the process. Excessive fresh water additions to the wash circuit can adversely affect the material balance. Thus, one may employ the effluent from a washing operation or filtration step that either precedes or follows the wash circuit. It will of course be recognized that the wash water must have lower concentrations of phosphoric acid and MCP than the liquor with which it is contacted so that mass transfer from the liquor to the wash water can occur.

Each wash unit yields an overflow stream containing MCP in a phosphoric acid solution. It is preferred to use the overflow stream from each unit as at least a portion of the wash water stream for the succeeding unit until a concentrated phosphoric acid solution is removed from the first unit where the flocculated fine solids enter the wash circuit. This procedure will help to avoid significantly altering the overall water balance on the wash circuit.

In the preferred embodiment of this invention, a multi-stage mixer-centrifuge circuit is employed and fresh flocculating agent is added in equal amounts to each stage in the circuit. It will be understood, however, that the flocculating agent can be added to each stage in amounts needed, if at all. While a three-stage circuit is shown in FIG. 1, a fewer number or greater number of stages can be employed. Also, a dewatering device such as a belt press filter can be provided following the final unit to remove some of the solution entrained in the solids before they exit the system.

Other methods can be used for the countercurrent washing of the slurry containing the fine solids. Such systems as countercurrent decantation can be used. Mix tanks and belt press filters can be used instead of the mix tanks and centrifuges. Combinations such as belt press filters between CCD stages or following the final CCD stage can be used to maximize the recovery of soluble $P_2O_5$ associated with the fine solids. When a belt press filter is used following the final stage of a CCD circuit, the filtrate can be added to the overflow of the final stage going to the next to final stage for additional efficiency in washing in that stage.

A further refinement in recovery of $P_2O_5$ from the fine solids before they leave the countercurrent wash system can be the addition of sulfuric acid to one or more mix tanks prior to the solids-liquid separator. This can be used when there is sufficient precipitated dicalcium phosphate or unreacted phosphate bearing components of the ore in the solids to warrant recovery.

8. Separation of Solids and Liquids

A stream containing coarse unreacted solids, such as sand, and some fine solids is obtained from the leach circuit, a stream containing gypsum is obtained from the crystallizer, and a stream containing flocculated solids is obtained from the fines wash circuit. The liquid phase of each stream contains dissolved substances, such as phosphoric acid, which have commercial value. Separation and removal of the solids facilitates recovery of dissolved substances. In addition, the solids can be recovered as by-products of the process once they have been separated from the liquids. Following is a description of methods that can be employed to effect separation.

Any of the conventional liquid-solids separation techniques can be employed in the process of this invention. While the use of conventional filtration techniques is preferred for the coarse solids and calcium sulfate crystals and centrifugation for the fine solids, other methods can be employed. For example, in some circumstances the use of hydrocyclones, gravity sedimentation, countercurrent decantation or pressure filters may be dictated by process economics.

Filtration of undissolved, coarse particulate solids from the liquid phase by passing the liquid through a membrane or other porous medium is preferred for economic reasons. The rate of filtration can be increased by the application of pressure or vacuum, either or both of which can be variable or constant. Furthermore, filtration can be carried out on either a batch or a continuous basis or combinations thereof. Combinations of filters can also be employed. For example, the major proportion of solids can be removed from the process stream in one filtration step, and the resulting filtrate can be passed through a clarifying filter, such as a polishing filter, to remove very small quantities of remaining solids. Filter aids can be added to the process streams in order to increase filtration rates, although the use of these materials has not been found to be necessary in small scale operation.

Preferred methods for handling each of the solids-containing streams will now be described. These techniques are intended to maximize the recovery of $P_2O_5$ in the overall process.

8.(A). Recovery of Coarse Unreacted Solids from the Leach Circuit:

The underflow from the last reaction zone in the leach circuit consists essentially of a slurry containing "acid washed" coarse solids, such as sand and a liquid phase comprising phosphoric acid and a minor proportion of monocalcium phosphate. There may also be a minor portion of fine solids in the slurry. The phosphoric acid solution in the slurry should be recovered for economic reasons. This can be achieved by separating the coarse solids from the slurry as a by-product and recycling the liquid and fine solids to one of the reaction zones as follows.

The solids can be separated from the major portion of the liquid fraction by wet classification in a conventional mechanical, non-mechanical or hydraulic classifier to produce a partially drained or thickened coarse solids fraction. A preferred embodiment is the use of a hydrocyclone with the overflow of liquid and fine solids returning to a reactor and the underflow going to a belt filter. The cyclone overflow typically returns to the same reaction zone from which it came. Recycle to the reaction zone from which the solids were withdrawn, as shown in FIG. 1, ensures that the maximum concentration gradient will be maintained between reaction zones.

The partially drained sand fraction on the belt filter can then be washed with water. Recovery of residual phosphoric acid should preferably be as complete as possible, since even a small loss will show up quickly in the economics of the operation. The recovered acid and the $P_2O_5$-containing wash liquid from the filter can be returned to one of the reaction zones.

It will be understood that the cycloning and filtration steps can be repeated as often as necessary, although a single pass through a classifier (cyclone) followed by filtration through a single belt-type filter should be adequate for Florida matrix and similar phosphate ores.

A typical run-of-mine Florida matrix processed according to the invention yields about 0.5 lb of sand per b of matrix (dry basis). The sand typically contains less than about 0.03 weight percent citrate insoluble $P_2O_5$. The sand product is useful for many purposes. It can be employed as a landfill, and thus returned to the site from which the phosphate matrix was mined. Furthermore, the sand does not contain any processing reagents, such as flotation agents, and because of its cleanliness, it may be used as a raw material for other industries.

8.(B). Filtration of Calcium Sulfate Crystals:

The crystallizer provides a clear overflow of phosphoric acid for recycle to the leach circuit or for removal from the process and an underflow stream in the form of a concentrated slurry of calcium sulfate and phosphoric acid for filtration. As previously described, the crystallizer can be of the classifying type or it can be a non-classifying agitated vessel.

In the case of a crystallizer of the classifying type, the clear liquid stream from the crystallizer can be divided between recycle and phosphoric acid product or used totally for recycle. The other stream from the classifying crystallizer contains gypsum or calcium sulfate hemihydrate, which can be filtered. The resulting primary filtrate can be recycled or removed as product acid, according to the choice taken for the crystallizer. The remaining solids can be washed to recover soluble $P_2O_5$ for return to the process as part of the recycle acid stream to the leach circuit.

In the case of a non-classifying crystallizer, the slurry from the crystallizer can be fed to a cyclone system which produces a low solids overflow stream for recycle to the leach circuit and a thickened solids underflow for feeding to a filter. The solids can be filtered and washed as previously described. The filtrate can be analyzed for phosphoric acid content and the filter cake analyzed for percent solids. The filtration operation can be repeated as often as necessary to achieve optimum recoveries so long as it is compatible with the desired material balance for the overall process.

8.(C). Filtration of Sludge from Countercurrent Wash Circuit:

As previously described, the thickened solids stream from the final wash unit of the wash circuit is a slurry comprising a mass of flocculated solids that has been depleted of $P_2O_5$ and a liquid phase partially enriched in $P_2O_5$. It is desirable to recover as much of the liquid as possible and to recycle the liquid to the process in order to avoid $P_2O_5$ losses.

The slurry from the final wash unit can be filtered in a pressure filter, such as a belt press filter, to recover as much of the liquid phase as possible. The resulting filtrate, which has the same concentration of solutes as the overflow stream from the final wash unit, is preferably combined with the overflow stream or sent directly to the preceding wash unit. The filtrate is thus used as part of the wash water stream for one of the wash units.

The resulting concentrated mass of solids from the belt press filter will contain a residual liquid level of approximately 30 to 45% by weight of the filter cake. At least a portion of the wash water fed to the wash circuit can be diverted to the filter and used as the wash liquid for the belts. This aids in recovery of $P_2O_5$ and prevents the buildup of fine solids on the filter medium. The resulting wash water can then be combined with the fresh water stream to the wash circuit or fed directly to the last wash unit in the circuit. In either event, the $P_2O_5$ in the solids is recovered and returned to the process. It will be understood that the wash water can be heated to increase recovery of the solutes, but area water at ambient temperature has been found to yield acceptable results.

The residual solids can be removed from the belt press filter and discarded or used as a by-product. It has been found that the solids form a sludge-like material that solidifies in a matter of days. The resulting solidified mass is lightweight and is suitable for use as a landfill. Thus, the mass can be deposited in the space from which the phosphate ore was taken in order to reclaim the environment. It may also be possible to convert the sludge-like material to a lightweight aggregate by calcining the filter cake at a suitable temperature.

9. Phosphoric Acid Product

The phosphoric acid solution from the process of this invention varies in $P_2O_5$ concentration according to factors relating to the feed ore, such as percent $P_2O_5$, percent insoluble material and percent water. It is economically capable of strengths from 20%–40% under various circumstances. The phosphoric acid solution can be concentrated to higher percentages using conventional techniques. For example, concentration can be carried out by evaporating a portion of the water in the solution under a vacuum. Single stage or multi-stage evaporators can be employed for this purpose.

In addition, some of the heat generated during the process can be utilized to heat the phosphoric acid solution to aid in evaporating the water. For example, the heat of dilution of the sulfuric acid or the heat generated while leaching the phosphate ore can be utilized for this purpose.

Experience with Florida ores has shown that the phosphoric acid solution is clear green to clear amber in color evidencing an improved product. It is believed that organic matter is removed from the primary process stream with the unreacted fine solids in the flocculation stage before the stream contacts the sulfuric acid in the crystallizer. This prevents charring and the black color associated with phosphoric acid produced by some other processes. In addition, there have been very few solids in the acid, and there is little or no post-precipitation when the product acid is removed from the process. The minor post-precipitation that does occur is over a period of several days or weeks.

10. EXAMPLES

The process can be more fully understood by reference to the following Examples in which all parts, proportions, ratios and percentages are by weight, unless otherwise indicated.

Due to the nature of phosphate ores, it was decided that confidence in the process could be gained more quickly through dynamic pilot plant work, rather than static bench tests. The following examples are derived from results of the pilot plant tests. Each test was conducted continuously over a period of days, during which at least two separate material balances were performed.

Due to the nature of the equipment, it was found that one material balance had to focus on recovery of the solid phases and the other material balance had to focus on recovery of the liquid phase. No series of tests indicated difficulties with reactions or recoveries that could not be simultaneously resolved in commercial equipment. Therefore, results are presented in one example for each of the two material balances and the projected performance of a larger unit integrating the results of the two balances.

EXAMPLE 1

In this Example, one of the first pilot tests of the leach process of FIG. 1 was conducted on typical Florida run-of-mine matrix. Matrix was fed into the acidulation leach circuit at the rates of 12.24 Kg/Hr together with recycle phosphoric acid at an approximately 12:1 ratio. This ratio has been defined as the total $P_2O_5$ in the recycle acid divided by the total Ca in the run-of-mine matrix. This is very nearly the same ratio as recycle acid $P_2O_5$:ore $P_2O_5$ when the Ca is at 1.036 ratio to ore $P_2O_5$ (1.45 ore CaO to ore $P_2O_5$). Acidulation leach circuit conditions were 150° F.±/−5° F., a recycle acid concentration of 18–22% $P_2O_5$ by weight and the 12:1 ratio.

Total residence time for the leach system is comprised of 45 minutes of countercurrent leaching and 30 minutes of cocurrent leaching.

The coarse fraction of the matrix was moved countercurrent through three leach tanks using a combination of agitated tanks and dewatering screws.

The fine fraction of the matrix, referred to as sludge, was carried cocurrent with the acid solution through two agitated leach tanks, a dewatering screw, and then to a sludge wash circuit.

Table I shows the accountability of the $P_2O_5$ for each of the waste streams. The overall accountability of output $P_2O_5$ relative to input $P_2O_5$ was 97%, of which product acid represented about 64%. The maximum potential recovery, product acid plus $P_2O_5$ in the entrained liquid associated with waste streams, was indicated to be about 88.7%.

TABLE I

| | Pounds | % $P_2O_5$ | Pound $P_2O_5$ | % of Input |
|---|---|---|---|---|
| Matrix In Waste Stream | 133.9 | 9.93 | 13.30 | 100.0 |
| SAND | | | | |
| Solids | 66.56 | 0.50 | 0.33 | 2.5 |
| Liquid | 17.44 | 1.89 | 0.33 | 2.5 |
| GYPSUM | | | | |
| Solids | 27.28 | 1.56 | 0.43 | 3.2 |
| Liquid | 19.92 | 3.76 | 0.75 | 5.6 |
| SLUDGE | | | | |
| Solids | 22.68 | 3.27 | 0.74 | 5.6 |
| Liquid | 14.12 | 11.16 | 1.58 | 11.9 |
| Total $P_2O_5$ in Waste Streams | | | 4.16 | 31.3 |
| $P_2O_5$ Accounted for as | | | | |
| Product Acid | | | 8.51 | 64.0 |
| Samples, Spills, etc. | | | 0.23 | 1.7 |
| TOTAL ACCOUNTED FOR | | | 12.90 | 97.0 |
| Total Not Available for Recovery (Associated with Solids) | | | | 11.3 |
| Maximum Potential Recovery | | | | 88.7 |

EXAMPLE 2

Another pilot plant run was conducted at conditions similar to those given in Example 1 in an effort to improve accountability of the $P_2O_5$. However, only 78.5% of the input $P_2O_5$ could be accounted for in the output streams. From this, and the previous test, it was realized that the material balances had to be conducted in two phases during a test in order to allow focus to be put on recovery of the solid and liquid phases separately. This was due in large part to the nature of the equipment. However, this test prvvided similar results relative to the amount of unreacted $P_2O_5$ lost in the solid phases. Thus, the results lead to the conclusion that if improved accountability and recovery of $P_2O_5$ from the liquid phase associated with the rejected solids could be achieved, the process would prove to be viable. The results of this test are shown in Table II.

TABLE II

| | Pounds | % $P_2O_5$ | Pound $P_2O_5$ | % of Input |
|---|---|---|---|---|
| Matrix In Waste Streams | 343.9 | 12.35 | 42.47 | 100.0 |
| SAND | | | | |
| Solids | 169.5 | 0.06 | 0.10 | 0.2 |
| Liquid | 44.5 | 10.80 | 4.81 | 11.3 |
| GYPSUM | | | | |
| Solids | 42.6 | 1.28 | 0.55 | 1.3 |
| Liquid | 34.4 | 18.54 | 6.38 | 15.0 |
| SLUDGE | | | | |
| Solids | 99.1 | 1.98 | 1.96 | 4.6 |
| Liquid | 57.9 | 10.54 | 6.10 | 14.5 |
| Total $P_2O_5$ in Waste Stream | | | 19.90 | 46.9 |
| $P_2O_5$ Accounted for in Product Acid or/Inventory Change | | | 13.42 | 31.6 |
| Total Accounted for | | | 33.32 | 78.5 |
| Total Lost to Spills, etc. | | | | 21.5 |
| Total Not Available for Recovery (Associated with Solids) | | | | 6.1 |
| Maximum Potential Recovery ($P_2O_5$ in Liquid Phases) | | | | 93.9 |

EXAMPLE 3

Another test at conditions similar to those given in Examples 1 and 2 was conducted. This was a continuous test over approximately one week. Two material balances were achieved, A and B. Balance A focused on improved recovery of the solids and B focused on improved recovery of the liquids. In A, the $P_2O_5$ accountability was 100% and in B it was 102%. The results of each balance is given in Table III. Table IV shows the projected results combining A and B, which is achievable in commercial equipment. Table V shows the distribution of $P_2O_5$ in the washed and dried solids which exit the system.

TABLE III

| | (A) SOLIDS MATERIAL BALANCE | | (B) LIQUID MATERIAL BALANCE | |
|---|---|---|---|---|
| Stream | % $P_2O_5$ | % of Input $P_2O_5$ | % $P_2O_5$ | % of Input $P_2O_5$ |
| SAND | | | | |
| Solids | 0.14 | 0.75 | [0.95* | 3.40] |
| Liquid | [3.97 | 1.40] | 3.14 | 1.70 |
| GYPSUM | | | | |
| Solids | 0.97 | 1.90 | [0.91 | 1.50] |
| Liquid | [4.92 | 4.10] | 3.32 | 1.80 |
| SLUDGE | | | | |
| Solids | 1.33 | 4.10 | [8.47 | 23.00**] |
| Liquid | [7.40 | 17.20] | 1.43 | 3.30 |
| Total $P_2O_5$ in Waste Stream | | 29.45 | | 34.70 |
| $P_2O_5$ Accounted for as Product Acid | | 66.00 | | 65.30 |
| Samples, Spills, etc. | | 4.85 | | 2.00 |
| TOTAL ACCOUNTED FOR | | 100.00 | | 102.00 |
| Total Not Available for Recovery (Associated with Solids) | | 6.75 | | 27.90 |
| Maximum Potential Recovery | | 93.25 | | 72.10 |

*Riser well separated from wall of vessel allowing unreacted material to by-pass.
**Stilling feed well inlet fines reactor fell off and allowed unreacted fines to short circuit directly to sludge discharge.

TABLE IV

| | % of Input $P_2O_5$ | From Balance |
|---|---|---|
| SAND | | |
| Solids | 0.75 | A |
| Liquid | 1.70 | B |
| | 2.45 | |
| GYPSUM | | |
| Solids | 1.9 | A |

TABLE IV-continued

|  | % of Input $P_2O_5$ | From Balance |
|---|---|---|
| Liquid | 1.8 | B |
|  | 3.7 |  |
| SLUDGE |  |  |
| Solids | 4.1 | A |
| Liquid | 3.3 | B |
|  | 7.4 |  |
| Total % of Input $P_2O_5$ | 13.55 |  |
| % of Input $P_2O_5$ in Solids | 6.75 |  |

TABLE V

|  | Total % $P_2O_5$ | % Citrate Insoluble $P_2O_5$ | % Citrate Soluble $P_2O_5$ |
|---|---|---|---|
| SAND | 0.14 | 0.12 | 0.02 |
| GYPSUM | 0.97 | 0.06 | 0.91 |
| SLUDGE | 1.33 | 0.22 | 1.11 |

EXAMPLE 5

This Example illustrates the quality of both product acid and gypsum produced by the acidulation process described in Examples 1 and 2.

Table VII gives the analysis of the matrix, product acid and gypsum produced.

The assignment for developing the process was to produce 20% $P_2O_5$ product, which accounts for the low percent $P_2O_5$ in the product solution in this Table. However, periods of operations up to 25% were sustained to show they were achievable.

TABLE VII

|  | Matrix | Product Acid | Gypsum Solids (Washed & Dried) |
|---|---|---|---|
| Total % $P_2O_5$ | 9.89 | 17.7 | 0.95 |
| % CI $P_2O_5$ | 11.11 | — | 0.05 |
| % CS $P_2O_5$ | 1.24 | — | 0.90 |
| % Ca | 11.66 | 0.25 | 21.4 |
| % Fe | 0.43 | 0.44 | 0.008 |
| % Al | 0.43 | 0.42 | 0.073 |
| % Mg | 0.14 | 0.13 | 0.06 |
| % F | 1.24 | 0.80 | 0.26 |
| % $SiO_2$ | 63.43 | 0.10 | 0.00 |
| % $SO_4$ | — | 1.20 |  |
| Specific Gravity | — | 1.190 |  |

EXAMPLE 6

In this Example, a sample of process acid from the test in Example 1 was evaporated in a three-stage method to simulate current wet phosphoric acid evaporation practices.

Results from Table VIII indicate that the acidulation process acid behaves almost identically to the current wet process acid during evaporation.

TABLE VIII

|  | % BY WEIGHT | | | |
|---|---|---|---|---|
|  | Initial Acid | First Stage Acid | Second Stage Acid | Third Stage Acid |
| % $P_2O_5$ | 17.69 | 35.2 | 47.73 | 59.07 |
| % Al | 0.52 | 1.07 | 1.64 | 2.09 |
| % Mg | 0.22 | 0.46 | 0.58 | 0.75 |
| % F | 1.08 | 1.37 | 1.21 | 1.06 |
| Al/$P_2O_5$ | 0.028 | 0.03 | 0.034 | 0.035 |
| Mg/$P_2O_5$ | 0.012 | 0.013 | 0.012 | 0.013 |

TABLE VIII-continued

|  | % BY WEIGHT | | | |
|---|---|---|---|---|
|  | Initial Acid | First Stage Acid | Second Stage Acid | Third Stage Acid |
| F/$P_2O_5$ | 0.061 | 0.039 | 0.025 | 0.018 |

It will be apparent from the foregoing description that this invention provides several significant advantages over existing phosphate ore processing systems. First of all, since it is possible to treat run-of-mine matrix according to the invention, raw material pre-treatment costs are reduced. It is not necessary to totally beneficiate the matrix prior to use in the process. This reduces the cost of processing sing and avoids the $P_2O_5$ losses that generally occur during beneficiation.

Furthermore, this invention provides improvement in digestion efficiency. By utilizing both countercurrent and cocurrent extraction, the reactivity of different sized particles can be addressed more specifically. Since the smaller particles are more quickly digested, they require less residence time and can be more quickly treated and extracted from the system. This is done in the less costly cocurrent method.

Also, by using the split system, the coarse residue can be discharged separately from the fine residue. Each discharge stream can be treated for recovery of soluble $P_2O_5$ by the most efficient method for the nature of the material. Discharge of the coarse and fine wastes separately also makes it possible to more selectively use the wastes. The materials can be marketed to help reduce overall product acid cost. The fine material may prove useful as a source of other recoverable chemicals. If they are to be disposed of, they can be more selectively discarded as in land reclamation where the coarse and fine material can be placed separately or together.

In addition, the coarse material can be more efficiently washed and the fine material, which cannot be washed on a vacuum or gravity type filter, can be washed in a centrifugation or countercurrent decantation system and then filtered in pressure type filters. This provides a significant improvement in recovery of soluble $P_2O_5$.

The design and operation of the gypsum circuit makes possible the reduced cost of not having to filter the entire liquid volume in the plant to remove the precipitated calcium sulfate. It also allows greater latitude in controlling the free sulfate to optimize the overall plant operation and $P_2O_5$ recoveries. The tests thus far have demonstrated the production of gypsum having a superior filtration quality. This allows a more economical filter and better washing to provide a much cleaner gypsum than existing processes produce. By total elimination of the slimes from the gypsum, as achieved by this invention, the poor filtration with attending high $P_2O_5$ losses inherent to other proposed similar processes are avoided.

The fine material, generally clays, will retain minimum water compared to the enormous amounts associated with disposal of clays in current ore beneficiation operations. Additionally, the large above ground slimes holding ponds can be eliminated.

In addition, the removal of the organic matter and unreacted fines prior to formation of the gypsum provides an exceptionally clean white gypsum. Such a product will be easier to upgrade to a saleable product.

The process allows optimizing conditions in the reaction zones separately from the calcium sulfate formation zone, thus providingthe best recovery of $P_2O_5$ from the ore without adversely affecting the quality of the calcium sulfate crystals or the loss of unreacted sulfuric acid.

The proposed invention also makes possible other significant savings over currently practiced technology due to separation of the phosphoric leaching step and the crystallization of gypsum by sulfuric addition. Current systems require very large solution-gypsum slurry recirculation rates to avoid $P_2O_5$ losses by gypsum encapsulation of ore particles due to high free sulfate levels around the particles. By adding the sulfuric acid to a solution of soluble calcium phosphate, this type loss cannot occur.

What is claimed is:

1. A process for producing phosphoric acid by the recovery of $P_2O_5$ from a phosphate ore, wherein the process comprises forming a slurry of a phosphate ore in an aqueous phosphoric acid solution in each reaction zone of a multi-zone reaction system in which reaction zones comprising the system are connected in series; said multi-zone reaction system including a first reaction zone and a last reaction zone;

introducing said phosphate ore into said first reaction zone;

introducing phosphoric acid into said last reaction zone;

reacting the phosphate ore in each reaction zone with the phosphoric acid therein to form a slurry consisting essentially of coarse solids, fine solids and monocalcium phosphate in the phosphoric acid solution;

removing a first process stream comprising coarse solids from the first reaction zone in the system and from each of the other reaction zones, except said last reaction zone, and transferring each of the first process streams from each reaction zone to the adjacent, successive reaction zone;

reacting the coarse solids in the first process stream from each reaction zone with the phosphoric acid in said stream to further leach the $P_2O_5$ from the coarse solids;

removing from said last reaction zone a slurry comprising coarse solids in a liquid phase, said liquid phase comprising monocalcium phosphate dissolved in phosphoric acid and containing a minor proportion of fine solids;

removing a second process stream comprising fine solids and the phosphoric acid solution containing the monocalcium phosphate from the last reaction zone in the system and from each of the other reaction zones, except said first reaction zone, and transferring each of the second process streams to the adjacent, preceding reaction zone in a direction that is countercurrent to the direction of flow of said first process stream and is cocurrent with the direction of flow of said phosphoric acid from said last reaction zone to said first reaction zone;

maintaining a differential of phosphoric acid concentration between said reaction zones with said concentration decreasing in each reaction zone in the direction of flow of said first process stream from said first reaction zone to said last reaction zone;

reacting the fine solids in the second process stream from each reaction zone with the phosphoric acid in said stream to further leach the $P_2O_5$ from the fine solids;

passing said resulting suspension from the second process stream in said first reaction zone into a retention zone and maintaining said suspension in said retention zone to further leach the $P_2O_5$ from the fine solids;

passing the reaction suspension from said fines retention zone into a settling zone and combining the suspension with a flocculating agent to form a slurry comprising a liquid phase consisting essentially of monocalcium phosphate in the phosphoric acid solution and a solid phase comprising floc containing the fine solids;

separating the solid phase from the liquid phase of the suspension;

reacting the monocalcium phosphate in the liquid phase from the suspension with sulfuric acid to form calcium sulfate crystals in a phosphoric acid solution; and separating the calcium sulfate crystals from the phosphoric acid solution.

2. The process as defined in claim 1 wherein at least one of the first process streams containing coarse solids also contains fine solids and a liquid phase comprising monocalcium phosphate in a phosphoric acid solution, and the process further comprises transferring a first process stream from a reaction zone to a separating zone;

separating said coarse solids from said fine solids and solution in said first process stream;

returning the resulting fine solids and solution to the reaction zone from which said first process stream was removed; and transferring the coarse solids obtained after said separation to said adjacent, successive reaction zone.

3. The process as defined in claim 1 or 2 including transferring said resulting suspension from the second process stream in said first reaction zone into a separating zone, separating coarse solids in said suspension therefrom, introducing said separated coarse solids into said first reaction zone, and introducing the remainder of said suspension into said retention zone.

4. The process as defined in claim 2 which further comprises transferring at least a portion of said coarse solids obtained after said separation to a said reaction zone from which said first process stream was removed or to a preceding reaction zone in said multi-zone system.

5. The process as defined in claims 1, 2 or 3 wherein at least a portion of said phosphoric acid solution separated from said calcium sulfate crystals is recycled into one of said reaction zones of said multi-zone system.

6. The process as defined in claim 5 wherein said at least a portion of said phosphoric acid solution separated from said calcium sulfate crystals is recycled into said last reaction zone.

7. The process as defined in claim 1, wherein said phosphate ore is unbeneficiated ore.

8. The process as defined in claim 1 wherein said phosphate ore is low-grade beneficiated phosphate ore or partially beneficiated phosphate ore.

9. The process as defined in claim 1, further comprising separating said coarse solids from said fine solids and liquid in said slurry removed from said last reaction zone, transferring said fine solids and liquid to one of said reaction zones, washing said separated coarse solids with water to remove entrained acid therefrom and transferring said wash water and acid to one of said reaction zones.

10. The process as defined in claim 9, wherein said wash water and acid are transferred to said last reaction zone.

11. The process as defined in claim 1, 2 or 3 wherein a solution containing monocalcium phosphate in phosphoric acid is occluded in the floc and is also entrained with the floc as a part of the slurry separated from the main process stream in the separation zone and the process further comprises processing the floc, occluded solution and entrained solution by continuous countercurrent washing to transfer at least a portion of $P_2O_5$ in the occluded and entrained solutions to a wash water stream; and combining the resulting wash water stream that has been enriched in $P_2O_5$ with the suspension to which the flocculating agent is added in the separation zone.

12. Process according to claim 1, 2 or 3, wherein a solution containing monocalcium phosphate in phosphoric acid is occluded in the floc and is also entrained with the floc as a part of the slurry separated from the main process stream in the separation zone, and the process further comprises processing the floc, occluded solution and entrained solution by continuous countercurrent washing to transfer at least a portion of $P_2O_5$ in the occluded and entrained solutions to a wash water stream; and adding the resulting wash water stream that has been enriched in $P_2O_5$ to one of said reaction zones.

13. Process as defined in claim 11, which further comprises processing the floc, occluded solution and entrained solution by continuous countercurrent washing to transfer substantially all of the $P_2O_5$ in the occluded and entrained solutions to said wash water stream.

14. Process according to claim 11, which further comprises breaking the floc into floc particles in order to release occluded solution;

combining the floc particles with flocculating agent in order to reform the floc; and separating the resulting reformed floc from the wash water.

15. The process as defined in claim 1, which further comprises controlling temperature and concentration at which the monocalcium phosphate is reacted with the sulfuric acid so that calcium sulfate dihydrate crystals are formed.

16. The process as defined in claim 1 which further comprises controlling temperature and concentration at which the monocalcium phosphate is reacted with the sulfuric acid so that calcium hemihydrate crystals are formed.

17. Process according to claim 1, which further comprises carrying out the reaction of the monocalcium phosphate and sulfuric acid in an aqueous reaction medium which is cooled by evaporating a portion of water in the aqueous medium.

18. The process as defined in claim 1, wherein the calcium sulfate crystals contain residual $P_2O_5$, and the process further comprises washing the calcium sulfate crystals with water to remove residual $P_2O_5$; and feeding at least a portion of the resulting phosphoric acid solution to at least one of the reaction zones of the multi-zone reaction system.

19. The process as defined in claim 11 wherein the monocalcium phosphate in the liquid phase is reacted with sulfuric acid to form calcium sulfate crystals in a phosphoric acid solution and said crystals are separated from said phosphoric acid solution, the process further comprising washing the separated calcium sulfate crystals with water to remove residual $P_2O_5$ from the crystals and to thereby form a secondary phosphoric acid stream; and feeding at least a portion of the secondary phosphoric acid stream to at least one of the reaction zones of the multi-zone reaction system.

20. The process as defined in claim 19 wherein said at least one of the reaction zones into which said portion of the secondary phosphoric acid stream is fed is the last reaction zone.

21. The process as defined in claim 19 wherein the slurry removed from the last reaction zone essentially contains the coarse solids and a liquid phase comprised of monocalcium phosphate in a phosphoric acid solution, said coarse solids being comprised mainly of sand, and the process further comprises separating the sand from said slurry removed from the last reaction zone; and returning the resulting liquid phase to one of the reaction zones.

22. The process as defined in claim 21, wherein the sand separated from the slurry from the last reaction zone contains residual $P_2O_5$, which process further comprises washing the sand with water to transfer the $P_2O_5$ to the water; and transferring the water containing the $P_2O_5$ to one of said reaction zones.

23. The process as defined in claim 19, which further comprises breaking the floc into floc particles in order to release said occluded and entrained solution;

combining the floc particles with flocculating agent in order to reform the floc; and separating the resulting reformed floc from the wash water.

24. A process for leaching $P_2O_5$ from a phosphate ore, wherein the process comprises forming a slurry of a phosphate ore in an aqueous phosphoric acid solution in each reaction zone of a multi-zone reaction system in which reaction zones comprising the system are connected in series; said multi-zone reaction system including a first reaction zone and a last reaction zone;

introducing said phosphate ore into said first reaction zone;

introducing phosphoric acid into said last reaction zone;

reacting the phosphate ore in each reaction zone with the phosphoric acid therein to form a slurry consisting essentially of coarse solids, fine solids and monocalcium phosphate in the phosphoric acid solution;

removing a first process stream comprising coarse solids from the first reaction zone in the system and from each of the other reaction zones, except said last reaction zone, and transferring each of the first process streams from each reaction zone to the adjacent, successive reaction zone;

reacting the coarse solids in the first process stream from each reaction zone with the phosphoric acid in said stream to further leach the $P_2O_5$ from the coarse solids;

removing from said last reaction zone a slurry comprising coarse solids in a liquid phase, said liquid phase comprising monocalcium phosphate dissolved in phosphoric acid and containing a minor proportion of fine solids;

removing a second process stream comprising fine solids and the phosphoric acid solution containing the monocalcium phosphate from the last reaction zone in the system and from each of the other reaction zones, except said first reaction zone, and transferring each of the second process streams to the adjacent, preceding reaction zones in a direction that is countercurrent to the direction of flow of said first process stream and is cocurrent with the direction of flow of said phosphoric acid from said last reaction zone to said first reaction zone;

maintaining a differential of phosphoric acid concentration between said reaction zones with said concentration decreasing in each reaction zone in the direction of flow of said first process stream from said first reaction zone to said last reaction zone;

reacting the fine solids in the second process stream from each reaction zone with the phosphoric acid in said stream to further leach the $P_2O_5$ from the fine solids; and removing said resulting suspension from the second process stream in said first reaction zone.

25. The process as defined in claim 24 wherein at least one of the first process streams containing coarse solids also contains fine solids and a liquid phase comprising monocalcium phosphate in a phosphoric acid solution, and the process further comprises transferring a first process stream from a reaction zone to a separating zone;

separating said coarse solids from said fine solids and solution in said first process stream;

returning the resulting fine solids and solution to the reaction zone from which said first process stream was removed; and transferring the coarse solids obtained after said separation to said adjacent, successive reaction zone.

26. The process as defined in claim 24 or 25 including transferring said resulting suspension from the second process stream in said first reaction zone into a separating zone;

separating coarse solids in said suspension therefrom, introducing said separated coarse solids into said first reaction zone, and introducing the remainder of said suspension into said retention zone.

27. The process as defined in claim 25 which further comprises transferring at least a portion of said coarse solids obtained after said separation to said reaction zone from which said first process stream was removed or to a preceding reaction zone in said multi-zone system.

28. The process as defined in claim 24 wherein said phosphate ore is unbeneficiated ore.

29. The process as defined in claim 24 wherein said phosphate ore is low-grade beneficiated phosphate ore or partially beneficiated phosphate ore.

30. A process for leaching clacium and $P_2O_5$ from an acidified suspension derived form acidulation of phosphate ore wherein said acidified suspension comprises fine solids suspended in a liquid phase comprising monocalcium sulfate in a phosphoric acid solution, said process comprising placing said acidified suspension in a retention zone and reacting said fine solids with the phosphoric acid for a time sufficient to substantially leach all of the $P_5O_5$ from the fine solids;

passing said suspension from said retention zone into a settling zone and combining the suspension with a flocculating agent to form a slurry comprising a liquid phase consisting essentially of monocalcium phosphate in the phosphoric acid solution and a solid phase comprising floc containing the fine solids, whereby the monocalcium phosphate in phosphoric acid is occluded in the resulting floc and is also entrained with the floc, processing the floc, occluded solution and entrained solution by continuous countercurrent washing to transfer at least a portion of $P_2O_5$ in the occluded and entrained solutions to a wash water stream;

separating and removing said wash water stream form the floc;

breaking the floc into particles in order to release occluded and entrained solution;

combining the floc particles with flocculating agent in order to reform the floc; and separating the resulting reformed floc from the wash water.

31. The process as defined in claim 30 wherein at least a portion of said wash water stream is returned to said settling zone.

* * * * *